US012008881B1

(12) United States Patent
Brand et al.

(10) Patent No.: US 12,008,881 B1
(45) Date of Patent: *Jun. 11, 2024

(54) WATER SAFETY DEVICE, SYSTEM, AND METHOD

(71) Applicant: Swamcam LLC, Montebello, NY (US)

(72) Inventors: Asher Brand, Monsey, NY (US); Gang Bi, Grayslake, IL (US)

(73) Assignee: Swamcam LLC, Montebello, NY (US)

( * ) Notice: Subject to any disclaimer, the term of this patent is extended or adjusted under 35 U.S.C. 154(b) by 143 days.

This patent is subject to a terminal disclaimer.

(21) Appl. No.: 17/719,612

(22) Filed: Apr. 13, 2022

Related U.S. Application Data

(60) Provisional application No. 63/194,574, filed on May 28, 2021.

(51) Int. Cl.
G08B 21/08 (2006.01)
G06V 10/82 (2022.01)
(Continued)

(52) U.S. Cl.
CPC ............ G08B 21/08 (2013.01); G06V 10/82 (2022.01); G06V 20/52 (2022.01); G06V 40/10 (2022.01);
(Continued)

(58) Field of Classification Search
CPC ........ G08B 21/08; G06V 10/82; G06V 20/52; G06V 40/10
See application file for complete search history.

(56) References Cited

U.S. PATENT DOCUMENTS 6,128,398 A   10/2000   Kuperstein et al.
6,133,838 A   10/2000   Meniere
(Continued)

FOREIGN PATENT DOCUMENTS

CN   103413114 A   11/2013
CN   104537273 A   4/2015
(Continued)

OTHER PUBLICATIONS

"Coral Detection Systems". Retrieved online on Apr. 12, 2022 from https://coraldrowningdetection.com/.
(Continued)

Primary Examiner — Andrew W Bee
(74) Attorney, Agent, or Firm — Eschweiler & Potashnik, LLC

(57) ABSTRACT

Systems and methods for improving water safety are provided. The methods include various features based on monitoring the area around a pool. Benefits are gained by applying artificial intelligence algorithms, as well as various techniques for improving processing speed and eliminating false alarms. A method for promoting water safety includes the steps of: video monitoring an area including around a body of water, and above or at a top surface of the water; detecting a presence of a human suspect in the monitored area through processing images of the video with computer implemented artificial intelligence; storing an image upon detection of the human suspect in the monitored area; processing the stored image to determine if the detection was a false alarm; and if the human suspect is determined to be a human in the monitored area, then transmitting an alert, either to a device in the area being monitored, to a mobile device, or both.

20 Claims, 16 Drawing Sheets

(51) Int. Cl.
   *G06V 20/52*   (2022.01)
   *G06V 40/10*   (2022.01)
   *G08B 25/00*   (2006.01)
   *G08B 29/18*   (2006.01)

(52) U.S. Cl.
   CPC ......... *G08B 25/008* (2013.01); *G08B 25/009* (2013.01); *G08B 29/186* (2013.01)

(56) References Cited

U.S. PATENT DOCUMENTS

| | | | |
|---|---|---|---|
| 6,154,140 | A | 11/2000 | Thorpe et al. |
| 7,123,746 | B2 * | 10/2006 | Meniere .................. G01V 8/10 |
| | | | 348/580 |
| 7,839,291 | B1 | 11/2010 | Richards |
| 8,669,876 | B2 | 3/2014 | Anderson et al. |
| 10,665,073 | B1 * | 5/2020 | Richerson, Jr. ........ H04N 23/55 |
| 10,889,002 | B2 | 1/2021 | Krauss et al. |
| 11,270,567 | B2 | 3/2022 | Thomas et al. |
| 2010/0295946 | A1 * | 11/2010 | Reed ................ G08B 13/19639 |
| | | | 348/E5.022 |
| 2012/0117072 | A1 * | 5/2012 | Gokturk ................ G06F 16/954 |
| | | | 707/E17.089 |
| 2014/0111332 | A1 | 4/2014 | Przybylko et al. |
| 2015/0215546 | A1 * | 7/2015 | Adachi .................. H04N 23/69 |
| | | | 348/240.2 |
| 2016/0026890 | A1 * | 1/2016 | Gupta ....................... G06T 7/20 |
| | | | 382/103 |
| 2016/0155314 | A1 * | 6/2016 | Snyder ................ G08B 21/086 |
| | | | 340/573.6 |
| 2018/0089980 | A1 | 3/2018 | Snyder |
| 2018/0356509 | A1 | 12/2018 | Haghighi |
| 2019/0034712 | A1 | 1/2019 | Golan et al. |
| 2019/0108735 | A1 | 4/2019 | Xu |
| 2019/0205608 | A1 | 7/2019 | Weitzman |
| 2019/0287378 | A1 * | 9/2019 | Rogers .................... G01S 15/86 |
| 2020/0246690 | A1 | 8/2020 | Weitzman |
| 2022/0254242 | A1 * | 8/2022 | Madden ................. G01S 7/53 |
| 2022/0366716 | A1 * | 11/2022 | Yoshida ............... G06V 40/103 |

FOREIGN PATENT DOCUMENTS

| | | | | |
|---|---|---|---|---|
| CN | 106022230 | A | | 10/2016 |
| CN | 107408300 | A * | 11/2017 | ......... G06K 9/00335 |
| CN | 107408300 | A | | 11/2017 |
| EP | 3816854 | A1 * | 5/2021 | ......... G06K 9/00362 |
| EP | 3816854 | A1 | | 5/2021 |
| WO | 2017037201 | A1 | | 3/2017 |
| WO | 2017130187 | A1 | | 8/2017 |

OTHER PUBLICATIONS

"PoolScout" Retrieved online on Apr. 12, 2022 from https://www.poolscout.co/.
U.S. Appl. No. 17/719,597, filed Apr. 13, 2022.
Bee, Andrew W., "Non-Final Office Action for U.S. Appl. No. 17/719,597", Mailed Date: Jan. 30, 2024, 114 pages.

* cited by examiner

WATER SAFETY DEVICE, SYSTEM, AND METHOD

CROSS-REFERENCE TO RELATED APPLICATION

This application claims priority to U.S. provisional application No. 63/194,574, filed on May 28, 2021, entitled Water Safety Device, System, and Method. That prior application is incorporated herein by reference in its entirety.

FIELD

The present disclosure relates generally to water safety, and more particularly for remote sensing and alarms for promotion of water safety.

BACKGROUND

Recreational swimming in pools and other bodies of water are an enjoyable pastime for many and has many societal benefits especially in hot climates. However, it carries a significant risk of death and permanent injury. Approximately 10 people drown every day, and drowning is a special risk for children, where it is one of the leading causes of accidental death in children ages 1-4.

Safety devices exist that monitor bodies of water and alarm when a potential drowning situation is present. However, these devices are located in the water. Most devices function by detecting disturbances in the water surface, or in some cases by monitoring underwater activity. These devices are focused on detection and alarming at the time drowning begins to occur rather than prior to water entry. These devices are also subject to many false alarms, which can cause users to be less vigilant in attending to the alarms. In addition, many of these devices suffer from poor integration with electronic systems that can provide notification to users located remotely from the pool. Given that the devices detect potential drowning situations as they are occurring, only sound alarms in the near vicinity of the drowning victim may be effective to provide sufficient warning anyway. It has been reported that it may take only 20 seconds for a child to drown. Accordingly, averting the continued prevalence of drowning and the need for quick detection, alerting, and prevention are long-felt and unresolved needs.

SUMMARY

Disclosed herein is a device that sounds an alarm and sends notifications to a smartphone that detects humans entering a pool area, spa area, river front area or other similar locations where people want to be warned about a human entering a location within an area. The device is located outside of the water and detects movement outside the water. In an embodiment, the device and system utilize artificial intelligence and provide improved notifications and alarms, earlier detection, a large area of surveillance, and the ability to improve false alarms rates. In an embodiment, a quick pairing method and/or a smart lock device are included in system and methods.

The following is a brief summary of subject matter that is described in greater detail herein. This summary is not intended to be limiting as to the scope of the claims.

In an embodiment, a computer implemented method for promoting water safety includes the steps of: capturing images including a vicinity of a body of water, and above or at a top surface of the body of water; cyclically scanning multiple portions of the images by formatting the images into portions, optionally shrinking the portions of the images to a smaller resolution, and processing the images with artificial intelligence to detect a human presence; sounding an alarm if the human presence is detected, sending a notification to a mobile device, or both.

In another embodiment, a system for promoting water safety includes a camera device configured to capture images in a monitored area around or above a body of water, the camera device configured for mounting to a structure outside the water; a computing device configured to process the captured images and to apply artificial intelligence for human recognition to the processed captured images; a mobile device configured to receive a notification if a human is detected in the captured images; and an extender in wireless communication with the camera device that extends a wireless network to the camera device.

In another embodiment, a system includes: a camera device housing including a camera and a computing device; an antenna housing including a Wi-Fi antenna and a Zigbee antenna, the antenna housing being outside the camera device housing; and a power cord running from the camera device through the antenna housing.

In another embodiment, a method for promoting water safety includes the steps of: video monitoring an area including around a body of water, and above or at a top surface of the water; detecting a presence of a human suspect in the monitored area through processing images of the video with computer implemented artificial intelligence; storing an image upon detection of the human suspect in the monitored area; processing the stored image to determine if the detection was a false alarm; and if the human suspect is determined to be a human in the monitored area, then transmitting an alert, either to a device in the area being monitored, to a mobile device, or both.

In another embodiment, a method for promoting water safety includes the steps of: video monitoring an area including around a body of water, and above or at a top surface of the water; detecting a presence of a human suspect in the monitored area through processing images of the video with computer implemented artificial intelligence; storing an image upon detection of the human suspect in the monitored area; optionally processing the stored image to determine if the detection was a false alarm; and, if the false alarm is not determined to be present or if the optional processing of the stored image to determine if the detection was a false alarm is not performed, then transmitting an alert, either to a device in the area being monitored, to a mobile device, or both; wherein a camera device performing the video monitoring is in communication with a WiFi network through an extender; and the extender is in communication with the camera device through the WiFi network and a Zigbee network.

In another embodiment, a method for promoting water safety includes the steps for promoting water safety comprising the steps of: capturing multiple images including an area around a body of water and the body of water; monitoring for a human presence in the area around the body of water and the body of water by cyclically scanning multiple portions of the images for a human suspect, the multiple portions including: front left, front right, back left, back right, and back center; wherein the multiple portions are scanned in the following scanning order: cycle 1, front left or front right, front right or front left, back left or back right, back right or back left; and then cycle 2, front left or front right, front right or front left, back center; wherein if front left or back left is scanned, then front right or back right is scanned in the same cycle. The scanning order is then repeated at least until a human suspect is detected.

The technology related to wireless networks is described in terms of Wi-Fi and Zigbee networks; however, these are specific examples of local networks, and other types of local networks could be used instead, in some embodiments.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE FIGURES

FIG. 7 is a combination of a view of a graphical user interface and a schematic of process steps it relates to.

DETAILED DESCRIPTION

Figure 1:
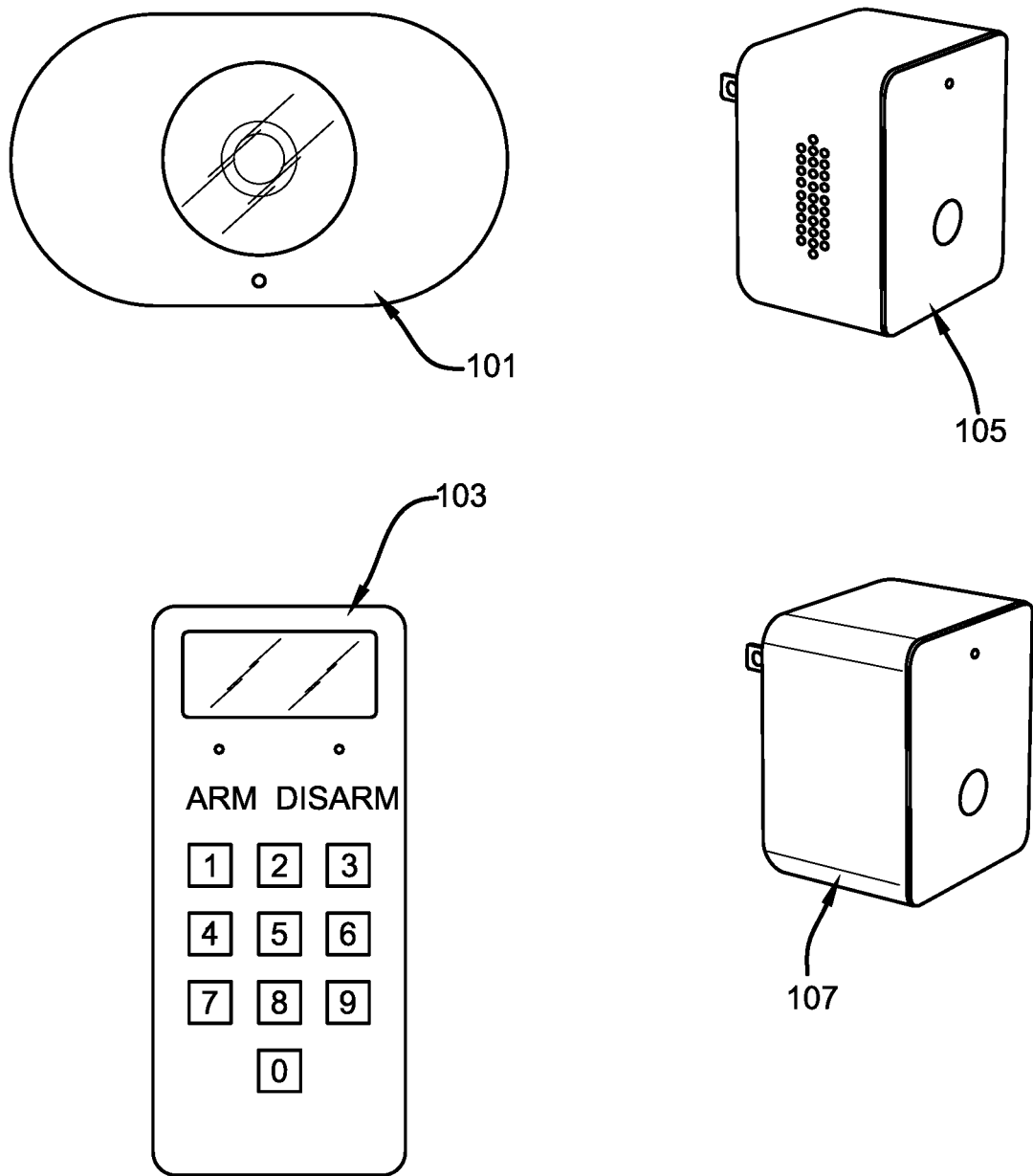
FIG. 1 shows perspective views of examples of components of the system described herein.

Various technologies pertaining to a water safety device and system are discussed, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a", "an" and "the", as used in this application and the appended claims, should generally be construed to mean "one or more" unless specified otherwise or clear from the context to be directed to a singular form. Further, as used herein, the term "exemplary" is intended to mean serving as an illustration or example of something and is not intended to indicate a preference. Also, as used herein, the term pool is used in describing the most common body of water that can be paired with a water safety device described herein; however, the term "pool" should be understood in its broader sense, as a pool of water, to apply to other types of bodies of water.

The present disclosure describes a device, system, and method for implementing pool surveillance and security, enhancing image processing efficiency for this purpose, and providing alarms for prevention of drowning. In an embodiment, the system alerts users of a human possibly entering the pool vicinity via the smart phone app and an alarm from the speakers of the camera device and wireless alarm. In an embodiment, the system also allows a user to communicate live with the human and watch what is happening in real time. This contrasts with most other pool devices that are local alerts to a wireless siren and are based on a sensing device placed into the water where detection is reported at the same time drowning occurs rather than prior to water entry. Others are also limited to local location of siren and subject to many false alarms at all times of the day and night.

FIG. 1 is an illustration of several components of the system for enhanced water safety. In an embodiment, the system includes a camera device 101, which can be powered by an AC plug or PoE (power over Ethernet). The camera device 101 may be equipped with onboard AI software to detect human activity. The camera device 101 is intended be stationary at all times, and the system may include mounting brackets to mount the camera to a wall, chain fence, PVC fence, aluminum or other similar fence. The camera includes a Wi-Fi, cellular, and/or ZigBee communication interface. It is linked with an alarm/extender through Wi-Fi and Zigbee, both links of Wi-Fi and Zigbee are maintained simultaneously.

In another embodiment, instead of WiFi, the camera device 101 can be in communication with the Internet through a cellular network. In this embodiment, a SIM card and associated cellular network antennae and circuitry can be installed in the camera device 101. Instead of the WiFi connections and pathways disclosed herein, in this embodiment, the camera device 101 is in communication with the other devices via the Zigbee network.

In an embodiment, the system includes a wireless battery-powered or PoE keypad 103 that may be mounted outside a pool gate for arming and disarming the alarm. In addition, one or more speakers 105 for sounding the alarm, which can be wired or wireless, are present. An alarm speaker is included on the camera device 101 and may be included on the keypad 103 as well. The system also includes a network extender 107 to carry a Wi-Fi signal to the pool area and its vicinity. The wireless network may transmit at a 2.4 GHz or 5 GHz frequency, but 2.4 GHz will provide enhanced range.

The vicinity or area of the pool or body of water, can include any fenced in area around the body of water. In certain examples, the vicinity or area of the pool may include a distance of 1 to 20 feet on each side, such as, for example, 5 to 15 feet, or 7 to 13 feet. The system is intended to monitor a body of water, and above or at a top surface of the water, but not underwater.

In an embodiment, the network extender 107 is in the same housing as the alarm speaker 105. Although it may also be a standalone device without an alarm speaker 105. This extender/alarm speaker 107/105 may be plugged in to a standard outlet and have a battery backup. In an embodiment, the network extender 107 is configured for quick pairing with the camera device 101 over a Zigbee network and through information transmitted through the Zigbee network it is configured to be automatically paired with the home wireless network. This simplifies the setup procedure, allowing the user to only need to pair the home Wi-Fi network with the camera device 101 to connect the camera device 101 and extender 107 to the Wi-Fi network.

In an embodiment, the system incorporates a user's mobile device, with system control software loaded thereon. For example, the system control software may be in form of an application for a smartphone (Android and iOS). This application is operable to control the alarm, view the camera, set parameters for the system, perform initial setup (as discussed above) and adjust other options. In an embodiment, the software enables specific time setting functions for motion monitoring as well as many other customizable features.

Figure 2:
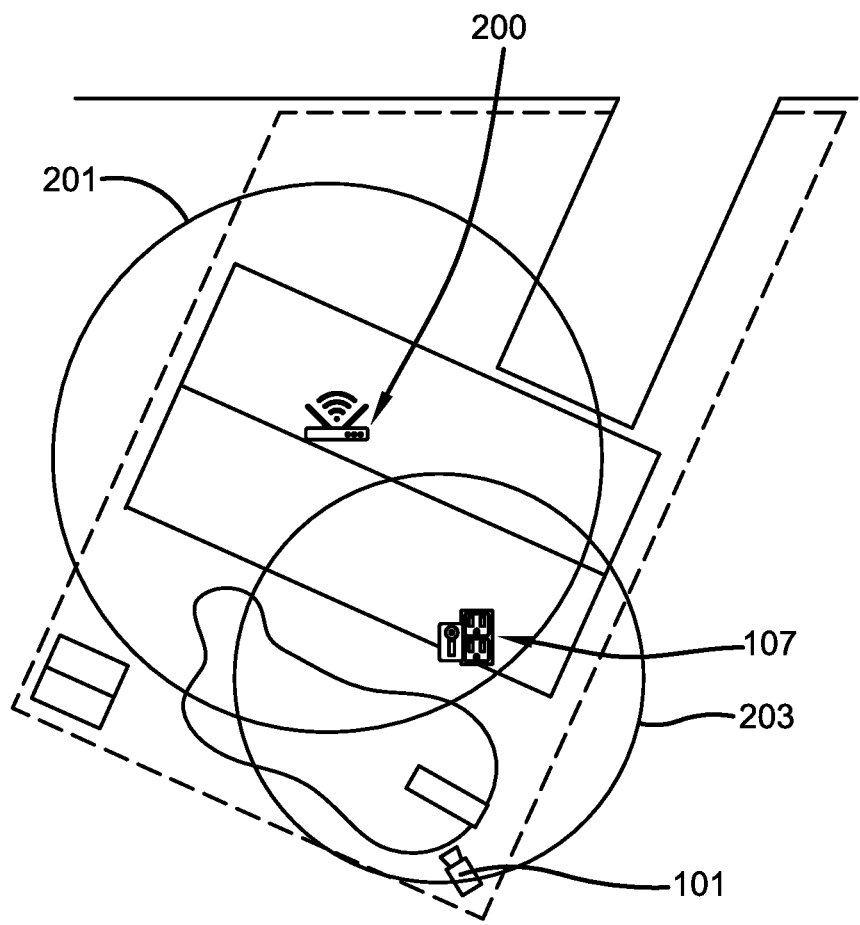
FIG. 2 is an overhead schematic view of an example of the system disclosed herein.

FIG. 2 is an overhead diagram of the system with a home router 200, extender 107, and camera device 101 near the pool 210 area. Router Wi-Fi coverage 201 and extender Wi-Fi coverage 203 are shown in the diagram. As can be seen, in many home/pool scenarios, the router 200 has insufficient range to reach the camera device 101 and the extender 107 is needed for the camera device to be in communication with the Internet. The extender 107 should be placed in range of the home router 200. For example, the extender 107 might be placed at or near a wall socket on the back wall (interior or exterior facing) of the home.

In one embodiment, the system can be quickly paired almost as soon as it is powered on, e.g., within 3 to 60 seconds, 5 to 45 seconds, or 10 to 25 seconds, in an embodiment, it can be paired within 5 minutes, 2 minutes, or 1 minute. When setting up the system for the first time, batteries are inserted into the keypad 103. Next the camera device 101 is plugged in, and if the user plugs in the extender 107 within an initial time threshold of the camera powering on, then the pairing of the camera device 101 with the extender 107 and keypad 103 will automatically and without user input take place with the camera device 101 operating as the Zigbee coordinator. The time interval can be preprogrammed into the start-up sequence of a component of the system, e.g., the camera device 101. Then, all that needs to be done by the user to pair the devices to the Wi-Fi network is to add the camera device 101 (that is, add its network address and identifier) to a system control application and enter the home router information, including identifier and password, into the system control application. The Wi-Fi network password and identifier will be transmitted to the extender over the Zigbee connection to the extender. Then the entire system will be paired and connected.

If the initial threshold for automatic pairing is exceeded, the user will need to follow the procedure below. A notification on the mobile device through the system control application can be used to guide the user to this process.

In another embodiment, the quick pairing can be done on the user's mobile device. In an embodiment, the system is further enabled to automatically take information entered during camera device 101 setup, regarding the home Wi-Fi network, e.g., network ID and password, and also directly connects the extender to the Wi-Fi. This can be done as follows, after camera device 101 setup, the Wi-Fi network information (network ID and/or password) is stored in the camera device 101. When an extender 107 is paired, the password and network ID, which may be stored on the computing device in the camera device 101, will be sent from the camera device 101 to the extender 107 through a Zigbee connection (Zigbee is used for pairing). This can be done automatically and without user intervention, or with a simple confirmation by the user. The extender 107 can include a machine-readable code including information for pairing the extender with the camera over the Zigbee network. In an embodiment, the machine-readable code is a QR code or barcode. The information encoded in the machine readable code may include a MAC address of the extender 107 to tell the camera how to pair with the extender 107 over the Zigbee network.

The keypad 103 may be paired to the camera by the same method as the Wi-Fi extender 107, i.e. by scanning a QR code with a mobile device running the system control software.

In an embodiment, the system with the quick pair extender 107 and camera device 101 can be used in other systems, such as security systems, surveillance systems, or other systems involving cameras that would be placed outside a typical Wi-Fi range. In a particular embodiment, the system can be used in a construction area to detect intruders. The system components and system control application would be similar to what is described herein, but the user can customize a zone for areas of particular concern, e.g., where valuable building materials are stored.

Additional details on the components of the system and the operation of the system are now discussed below.

In an embodiment, the camera device 101 is in communication with the keypad 103 through the Zigbee network. It communicates with mobile devices (e.g., ANDROID or IOS) smartphones through Wi-Fi or cellular network. The camera device 101 connects to the internet through Wi-Fi either by connecting directly to the home router 200 over Wi-Fi or connecting to an extender 107 (which is connected to Wi-Fi Internet through the router 200) and the camera device 101 will choose the stronger connection of the two for communicating. A computing device associated with (e.g., included in the housing of) the camera device 101 actually processes the signal strengths and chooses the strongest one. Furthermore, if the extender 107 is stronger but goes "offline," the camera device 101 will jump back to a direct connection to the router 200 if such connection is strong enough.

In an embodiment, the camera device 101 acts as a central monitoring device. It is properly mounted on the fence or home siding or other appropriate location to monitor the swimming pool vicinity. The swimming pool vicinity may, for example, be the pool and a 20 foot to 1-foot distance around the pool in all directions, or a 15 foot to 5-foot distance around the pool in all directions.

The system uses AI technology to detect a human being in the pool area. The AI is trained with algorithms to recognize humans and firmware may be upgraded periodically to improve human recognition. In an embodiment, when the camera device 101 detects a human, such as a child, in the swimming pool area (through AI image recognition discussed below), a processor associated with the camera device 101 does one or more of the following actions.

(1) The speaker in the camera device 101 will sound an alarm notice. In an embodiment, a controller associated with the camera device 101 will send a wireless command to the alarm speaker/extender 105/107, which will make a high decibel sound to notify people inside the home. The extender 107 is meant to be plugged in inside the home, but closest to the area facing the camera. It could also be plugged in outside the home, e.g., on a wall near the back door.

(2) A notification is sent through the Wi-Fi or Zigbee network, or both, to the extender 107, which then forwards the message to the router 200 (or alternatively, without an extender 107 the notification is sent directly to the router 200), then through the internet and/or cellular network to smart phones running the system control application. In response to the notification, if the user initiates, the smart phone will open a live view as seen by the camera and allow the user to have a one-way video and two-way audio chat using the smart phone application. The user can talk to the human in the pool area, warning them to stay away.

In an embodiment, when the system detects a human, the camera device 101 can also playback a pre-recorded customized voice message (e.g., with the voice of the owner) to remind the human to leave the pool area instead of sounding an alarm sound.

The keypad 103 is a control accessory that can be mounted in the vicinity of the pool, e.g., at the entrance to the pool area, such as on a fence near a gate to the pool. The keypad 103 has multiple keys, and can be used to arm/disarm, or provide other commands to the system. A PIN is used to enable or disable the system. The system includes mounting brackets for the camera device 101 and keypad 103 to mount on either-wall, chain fence, PVC fence, aluminum or similar fence. In an embodiment, the keypad 103 can be loaded with the same or similar system control application as would be used by a user with a mobile device. The separate keypad mounted near the pool vicinity allows access to users other than the pool owner (such as pool maintenance crew, landscaper, pool guests). These people can be given the PIN for access to the pool area to arm and disarm when entering the area without triggering the alarm. The pool owner will typically use the mobile app to arm and disarm but may also use the keypad. Without the keypad, the system would be difficult or awkward to use for visitors that do not have access to the system control application on the homeowner's mobile device.

The keypad 103 also notifies the pool owner to when the keypad 103 is being used so that the owner knows when people enter the pool area. This is done by the system sending a push notification and/or email to the user through the app every time the keypad 103 is armed and disarmed. This gives the owner more control over and information on the pool environment.

In an embodiment, the speaker 105 has a direct AC connection through a typical AC plug. The speaker 105 has a high decibel sounding alarm that emits when the controller associated with camera device 101 triggered by a motion detection event sends a wireless command. A siren alarm sounds to notify others inside the home. This addresses the case where the user does not have their mobile device with them and does not hear the alarm from the camera device 101 (which is outside near the pool). A standalone speaker 105 (i.e., one that is not paired with an extender 107) can be placed anywhere in the Wi-Fi range, Zigbee range or both, of the router 200 or extender 107.

In an embodiment, the extender 107 in this system has two functions: (1) it acts as a Wi-Fi signal extender/booster; and (2) has alarm siren functionality. Since the camera device could be mounted far from the house, the home router Wi-Fi signal at the mounting spot could be weak or non-existent. The extender 107 enables the camera device 101 to be mounted in an optimum location near the pool. In an embodiment an additional extender 107 may also be placed outside between the home and the pool in order to further boost the range of the Wi-Fi network and provide an external alarm. Also, in an embodiment, the keypad 103 may include a Wi-Fi extender. The camera device 101 itself may also include a speaker for sounding alarms.

Without the integration of the Wi-Fi extender 107 into the system, most users would likely not get a sufficiently strong Wi-Fi signal and would need a separate extender, which can be very bothersome to pair with devices and make it difficult to use. Also, as the system can be used with an extender 107 that includes an alarm this is beneficial over having 4 devices instead of 3 to be paired together, which would make this system not as user friendly. The extender 107 is also beneficial for allowing other devices to have access to the network and Internet around the pool area.

In an embodiment, extra speaker 105 units (without an extender functionality) or extenders 107 with alarm functionality can be added to and paired to the system via the code scan or auto-pair on power-up system described herein.

The software application is designed to run on a smartphone operating system, such as, for example, ANDROID or APPLE IOS. It could also run on a WINDOWS or MAC platform for tablet, desktop, or laptop computer. The application receives alerts, communicates with the camera, and allows the user control over systems functions.

Figure 3A:
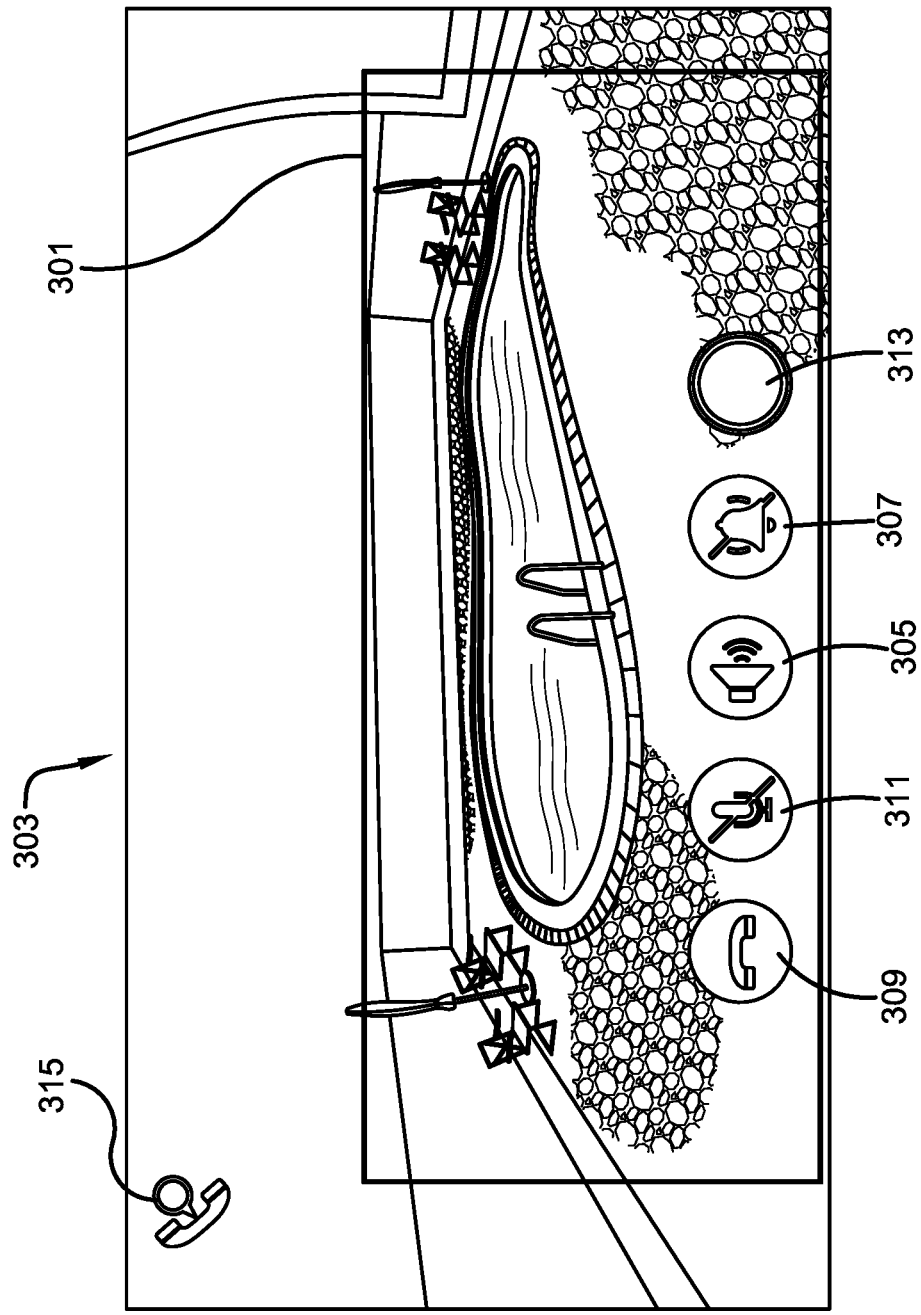
FIG. 3A is a view of a screenshot of an example graphical user interface for a system control application.

In an embodiment, during initial setup, a monitoring area graphical overlay 301 is shown on the system control application over a live view 303 from the camera. The user is instructed to adjust the camera view to cover areas they wish to monitor inside the monitoring area, such as by moving the camera to place the water and the vicinity of the pool in the monitoring area by adjusting the location, height and angle of the camera device 101. FIG. 3A shows this view. In an embodiment, a customized zone may be set where the user can move the outline of the areas to be monitored instead of moving the camera live view 303. In another embodiment, an area of the screen can be excluded if there is area that the user does not want to be monitored.

Figure 3B:
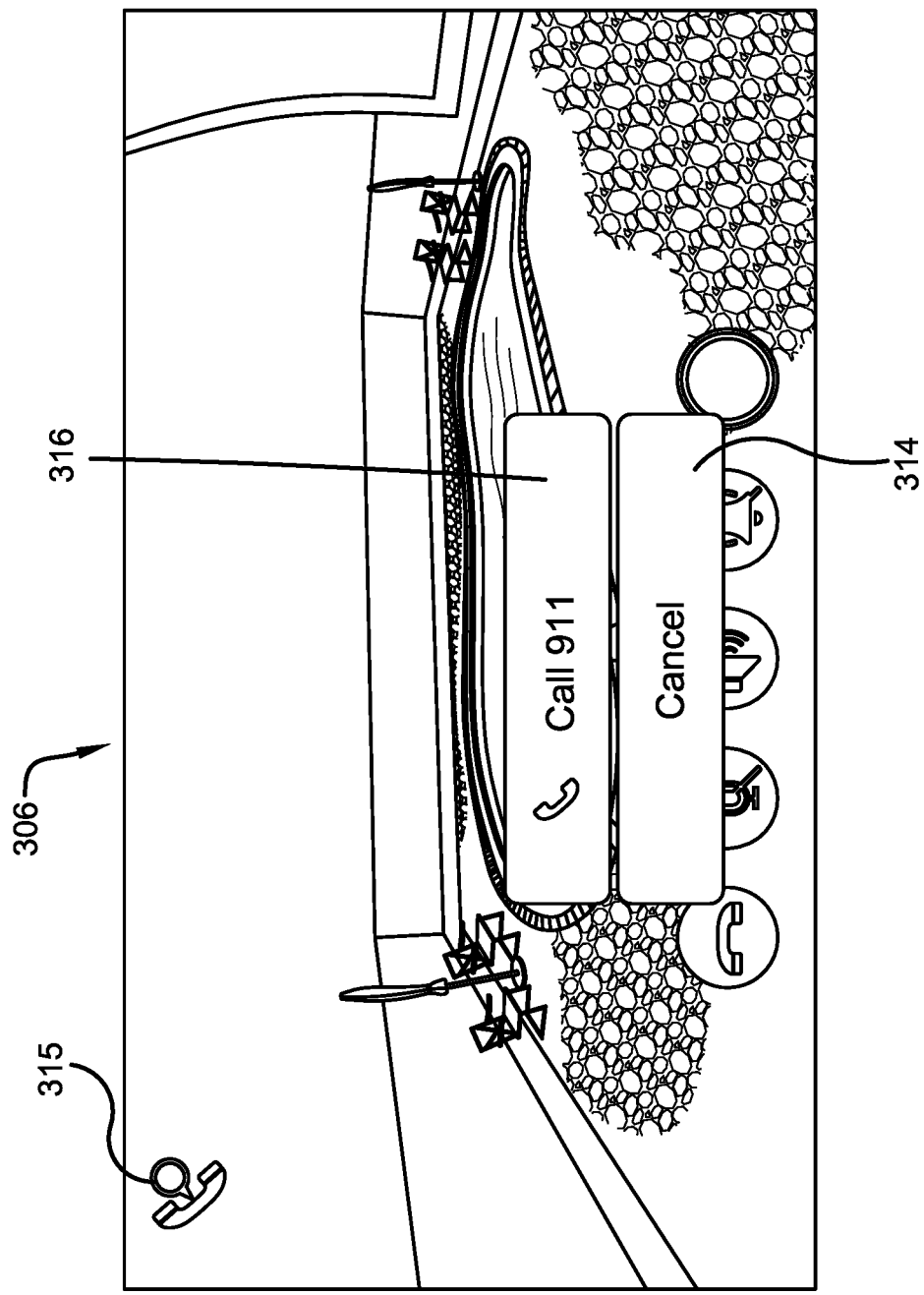
FIG. 3B is a view of a screenshot of another example graphical user interface for a system control application.

The system control application also has a soft button to arm/disarm the system. When the system is armed, it will begin the monitoring, as well as sending alerts to the smartphone when a human is detected. When the system is disarmed, it will stop the monitoring. Also the system allows direct dial to 911 from live view with the press of a soft button 315 or from a soft button 316 on a second intermediate screen 306 as shown in FIG. 3B, and also allows for an additional customized number to be programmed for direct dial (not shown but would be analogous to the soft button 316). A cancel button 314 returns to the live view 303 screen.

A soft button 309 terminates the live view. A next soft button 311 mutes or unmutes the microphone, to allow the user of the mobile device to speak through the speaker(s) in the pool area. A next soft button 305, is used to mute or unmute the sound detected from a microphone in the pool area, such as a microphone contained on the camera device 101. Button 307 is used to mute the speaker on the extender 107. In an embodiment, when an alarm is triggered a siren sounds on the camera device 101 and the extender 107. However, when a user opens the system control application it will automatically stop the alarm on the camera device 101 but not on the extender 107. By tapping 307 it silences the extender 107. Finally, a soft button 313 can be pressed to record the video and audio in the pool area. Some of these functions can also be available on the dedicated keypad 103 that may be placed at pool gate.

Other functions that can be controlled by the system control application include the following. The user can change the PIN number in the application to any desired PIN number. The application can be used to set up the entire system on the home Wi-Fi network. For example, once entered by the user, the application through the smartphone interface can communicate the Wi-Fi network ID and password to the other connected components of the system. The application also allows some customization of the system such as setting "quiet" times when the system will not monitor to avoid extra false alarms. Additional setup options include a sensitivity setting. The system allows for automatic alarm customization—if a user forgets to "arm" after leaving they can preset an amount of time when the system will "arm" itself after "disarm."

Figure 4:
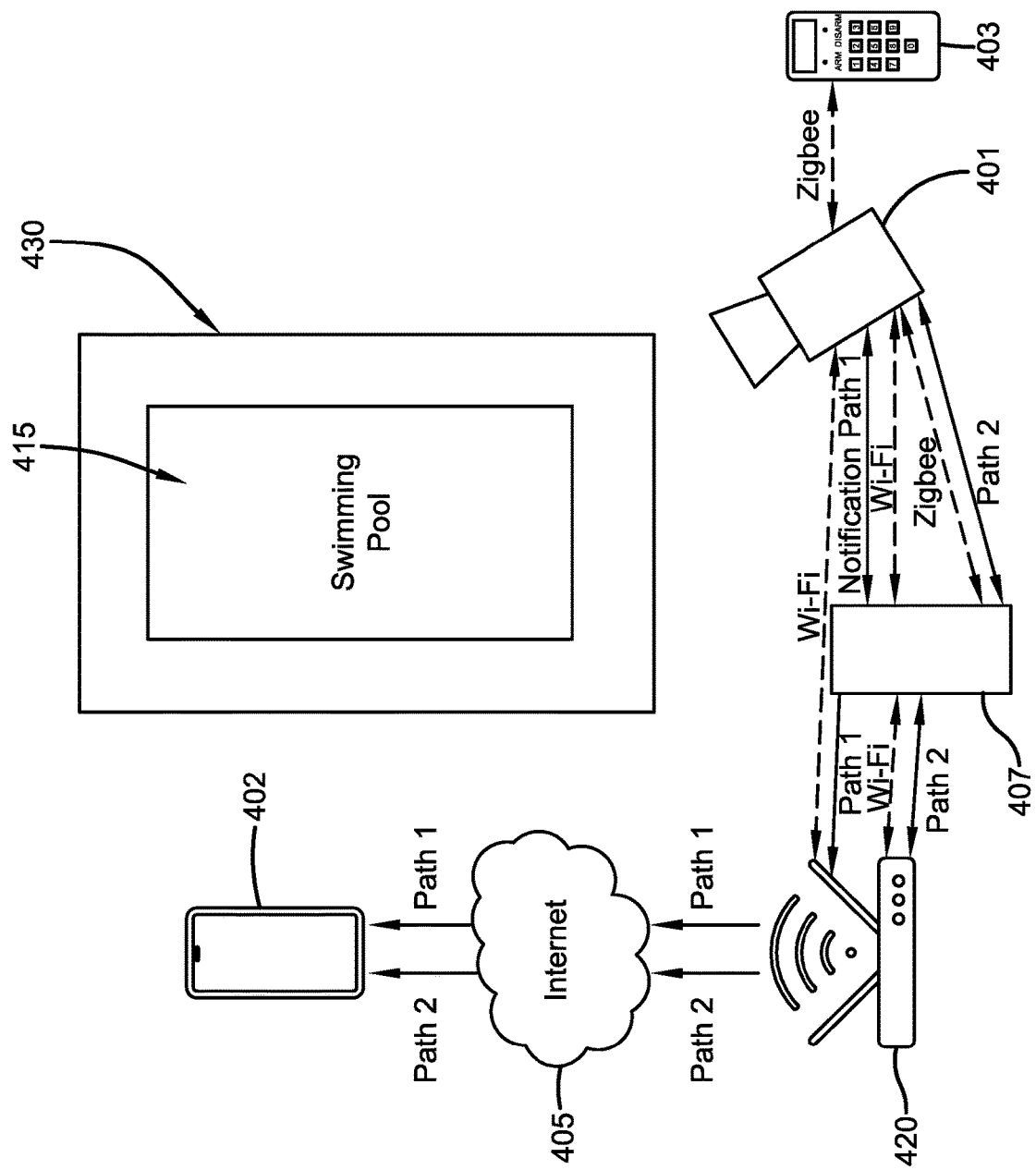
FIG. 4 is an overhead schematic view of an example of the system disclosed herein.

In an embodiment, the system includes a method for redundant notification. FIG. 4 discloses an example pool safety system, including a mobile device 402 (IPhone® smart phone, Android® smart phone, tablet, laptop, any computing device running an application that communicates with the system), Internet 405, router 420, alarm/extender 407, camera device 401, keypad 403, and a body of water (swimming pool) 415. A rectangular area is delineated around the swimming pool 415. This is the monitoring area 430, that is, the area in view of the camera in which detection events may occur.

In an embodiment of the method associated with this system, when the camera device 401 detects a human being (e.g., a child), it transmits a communication to the mobile device 402, and a notification will be displayed on the mobile device 402. This can be done over Wi-Fi through notification path 1, which goes through the router (optionally first through the Wi-Fi extender) through the Internet 405 to the mobile device 402.

If the Wi-Fi connection between the camera device 401 and the alarm/extender 407 and the camera device 401 and the router 420 is temporarily inoperative (Wi-Fi signal is temporarily not stable), then the notification may not be sent to the Internet 405 and the alarm will not be triggered. In this case a redundant design was implemented to prevent accidental failed notifications. Whenever there is a detection event, the camera device 401 will transmit a notification through path 1 to the mobile device 402, and, at the same time or within milliseconds, also send notification to the mobile device 402 through path 2.

The path 2 notification comprises sending the notification upon the detection event from the camera device 401 through the Zigbee network to the alarm/extender 407, the extender 407 then connects to the router 420 through Wi-Fi which connects to the Internet 405, where it is routed to the user's mobile device 402. The extender 407 also sounds a local alarm through a device is coupled to that is capable of emitting an audible alarm, such as a speaker in the same housing as the extender 407.

The difference of path 1 vs path 2 is that path 1 is done through a Wi-Fi only interface to the router 420. Path 2 is done though a Zigbee interface to the extender 407, then through Wi-Fi to router 420. The Zigbee path to the alarm/extender 407 resolves issues caused by instability in the Wi-Fi signal to the camera.

In an embodiment, after a detection event, and a notification being sent to a mobile device 402 and/or an alarm sounding, a reset period will follow. The reset period may be ended after a certain time, e.g., 10 seconds to 1 minute, such as 15 seconds to 30 seconds, or after a notification has been acknowledged on the mobile device 402. During the reset period, the system continues to monitor as it had been doing prior to the detection event, only continuous notifications of events are not sent.

In an embodiment, to monitor the pool area, video from the camera device 401 is taken in frames and some (e.g., 50 to 99%) or all frames are saved temporarily as images for processing. A maximum number of frames is determined by the frame rate of the camera itself (expressed in frames per second or FPS). The frame rate is the frequency (rate) at which consecutive images, frames, appear on a display or are captured by the camera. The term applies equally to film and video cameras, computer graphics, and motion capture systems. For example, for a camera recorded video, it could be 1080 P 30 FPS or 720 P 25 FPS. Frame rate may also be called the frame frequency, and can be expressed in hertz. In an embodiment, a frame rate of 360 FPS to 20 FPS, such as 100 FPS to 30 FPS, or 75 FPS to 40 FPS is the range or upper limit for frames that can be saved and processed for analysis.

In an embodiment, the entire area of the frames is not used, but only a pre-defined area of the frames is saved. Thus, a modified image is saved for processing. In another embodiment, only certain portions of the frame are processed and other areas are ignored. By focusing on a smaller area and the area immediately around the pool that would be occupied by a human, this increases the probability of a quick determination of motion detection and reduces unnecessary calculation.

In an embodiment, portions of the camera view are excluded from saving and processing in an unnecessary monitoring area 430. In an embodiment, approximately the top one third of the view, e.g. the top 45% to 10%, 40% to 20%, or 35% to 30% is excluded from processing. When the camera is mounted either on a fence or some appropriate location, its top one third of the view will generally be a view of the sky. That area is not a location that the user is interested in monitoring, so this area will be excluded from motion detection. For example, on FIG. 3A, the picture size is 1280×720, its top area of 1280×240 will be excluded. In an embodiment, this non-monitored area is fixed for the particular lens on the camera, and can be viewed as a graphical overlay 301 (FIG. 3A) on the live view via the app on the mobile device 402. The user can adjust the monitoring area 430 by moving the camera. The non-monitored areas would not be conducive with all lens types and are calibrated to the particular lens used in the camera device 401.

Figure 5:
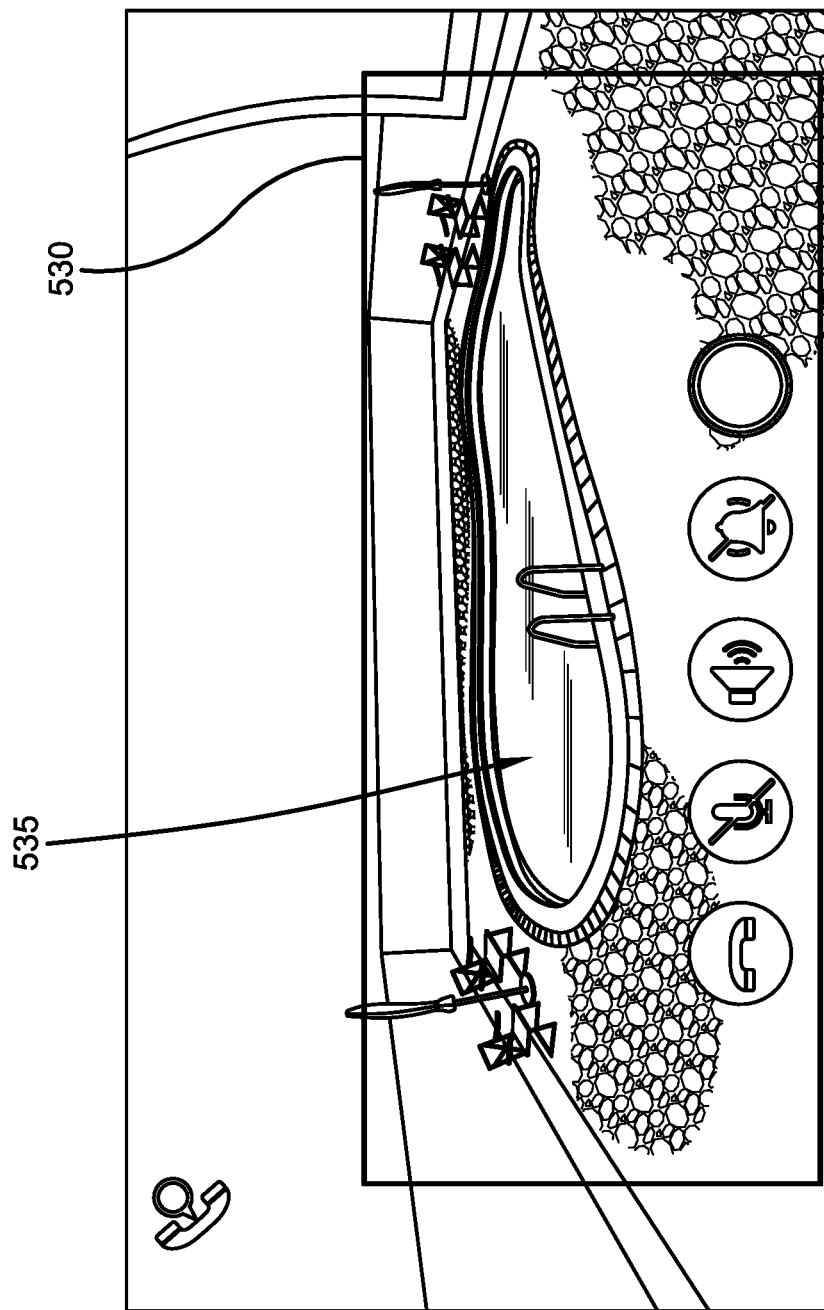
FIG. 5 is a screenshot of an example graphical user interface for a system control application.

In an embodiment, for example, as shown in FIG. 5, the water area 535 inside the swimming pool is excluded for motion calculation. The water area can thus be excluded from saving and/or processing. For a swimming pool filled with water, there will always be motion from the pool's water, especially if there is wind, which increases the amount of false alarms. The system is designed to send an alert before any incident occurs in the water, thus by avoiding the water area, the system is able to lower the amount of false alarms and increase the speed of alarm notices. Note that in this embodiment, the monitoring area 530 is also wider, i.e., out to the edge of the camera view.

In an embodiment, the user will have the option in the app on the mobile device to see the excluded area and adjust the angle of the camera, so that it covers the area needed for detection. In an embodiment, this area of exclusion can even be set by the user. In this manner the user can customize the monitoring to exclude areas of their pool that they do not want processed, e.g., for privacy purposes, or for areas that are not a concern, such as areas shown on the camera that are outside a fence, or for areas that are frequent sources of false alarms. The exclusion of more areas can improve processing speed and performance.

In an embodiment, the entire view screen area is monitored, but this can increase false alarms due to birds and trees or other overhead objects. The entire view screen being monitored can be an option for customization by the end user.

In an embodiment, facial recognition technology is not used. There is no zooming or focusing on any facial features, such as the eyes to determine whether the object in view is a human. This can also improve processing speed and performance.

In an embodiment, the system is triggered to operate through a motion detection algorithm. Motion detection is the process of detecting a change in the position of an object relative to its surroundings or a change in the surroundings relative to an object.

Figure 6:
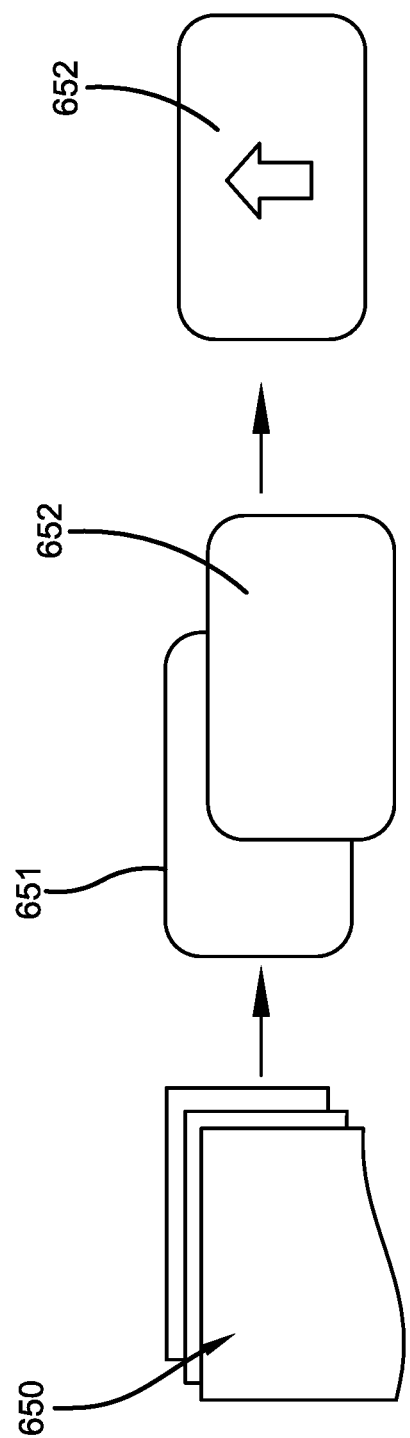
FIG. 6 is a schematic illustration of an example method of processing disclosed herein.

As shown in FIG. 6, in an embodiment, first and second frames, 651, 652 from the full set of frames 650 from the camera are processed to determine if there is a difference between them to determine if motion is detected. These frames may consecutive or non-consecutive. In an embodiment, if motion is detected, a method for detecting humans is then initiated on one of the frames, e.g., the most recent frame 652.

In an embodiment, a human detection algorithm is part of the system described herein. For human detection, the AI engine takes a picture as input, and outputs a result of Yes or No to identify a human being inside the monitored area or not. In an embodiment, the AI engine resides in software on the computing device associated with the camera device 101, e.g., in the same housing as the camera device 101.

In an embodiment, the AI engine running on the computing device takes an image portion as described herein as input, then outputs several data items:
1. Class: for a valid detection the class should be a human being.
2. Location of the detection object: the coordinates representing bounding boxes in the coordinate form (top-left, bottom-right)
3. Confidence score: This is a value between 0 and 1 representing probability that a class was detected. The closer the number is to 1, the more confident the model is. A threshold can be set based on this confidence score. In an embodiment, this can be adjusted by the user, e.g., via the mobile device app.

In an embodiment, the image size requirement is 300×300, and regardless of monitoring area settings, images will be converted into this size before recognition. Other image sizes can be used, but a standardized size aids in efficient processing. In another embodiment, the image size is not reduced in size, but the entire monitored area is processed for image recognition at its native size.

Figure 7:
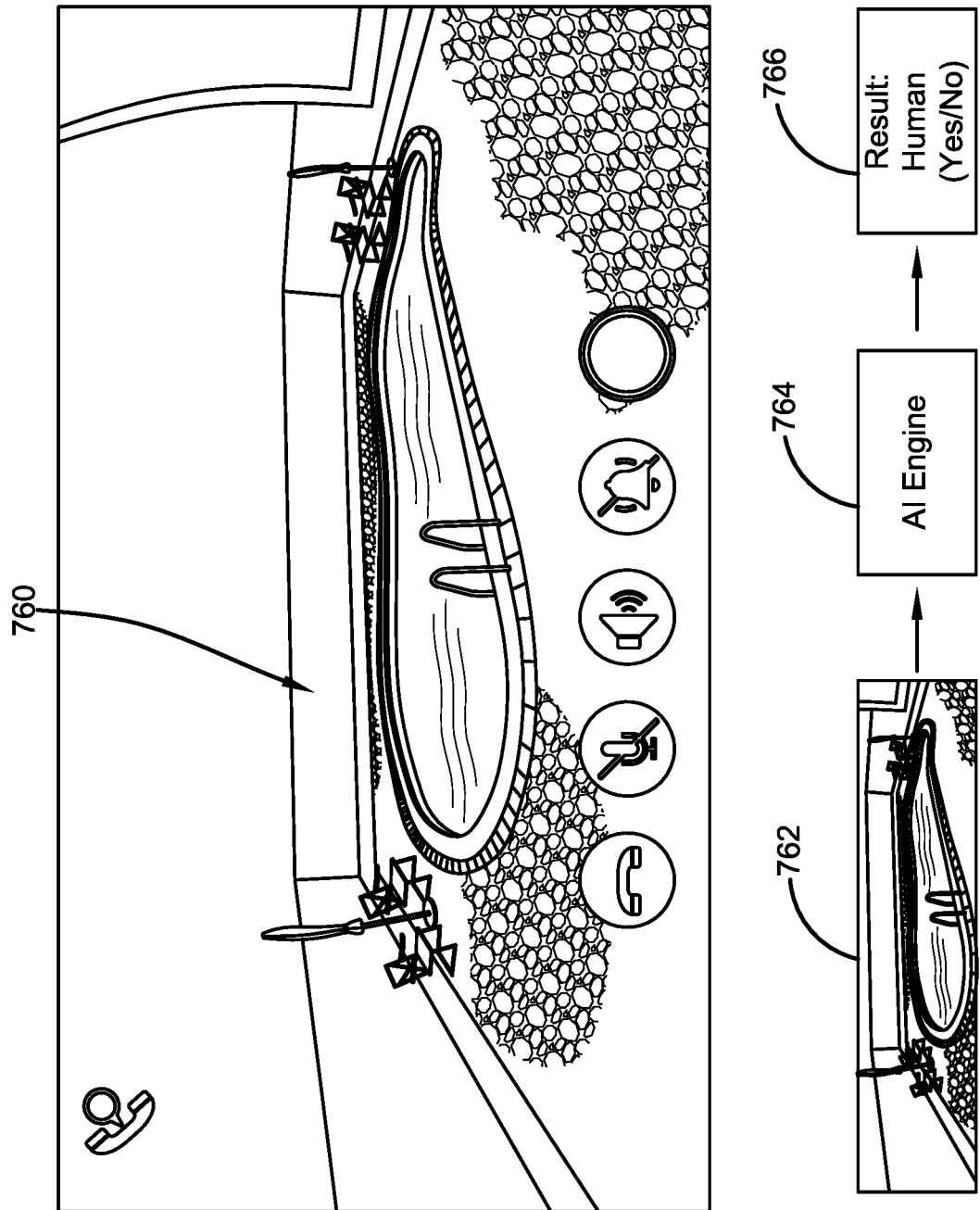

For AI image capture systems, when motion is detected, the common approach is to retrieve the whole frame (for example 1280×720 size) and feed it into the AI machine, the AI will shrink it to 300×300 first, then begin the recognition. For a big picture with 1280×720, the human is large and recognizable. However, in an embodiment, the system processes the image in a series of cyclically scanned image portions that are smaller, e.g., 800×800 or 530×530, also, in an embodiment, the images can be shrunk into a standard size picture. In either case, the human being will be smaller and possibly unrecognizable. This is worse when a young child is walking at the far end of the swimming pool and it becomes very difficult for the system to recognize and determine if it is a human. FIG. 7 illustrates this process where a large full resolution image 760 from each video frame is shrunk into a smaller picture 762. As shown, the system would send the smaller picture 762 (e.g. 300×300) to the AI engine 764 for human detection 766. A child inside the smaller picture 762 is very small and hard to be recognized by the AI engine 764. In another embodiment, the full resolution image 760 will be used for AI detection.

Figure 8:
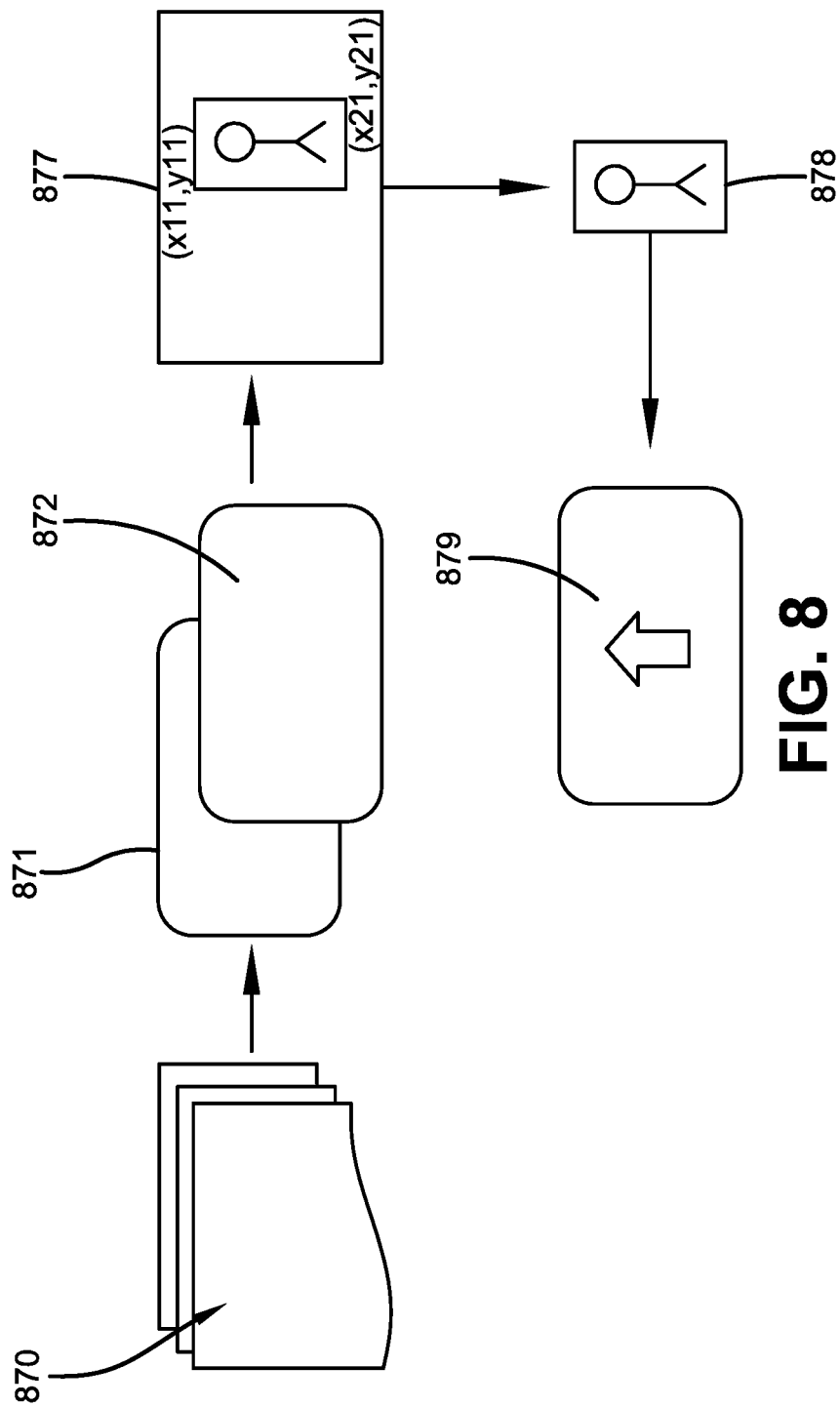
FIG. 8 is a schematic illustration of an example method of processing disclosed herein.

Instead of the above approach, in an embodiment, the method includes first zooming in on the motion detected object inside the frame. Then a standardized (e.g., 300×300) frame is defined around a center of the motion detected object. This is performed by a processor in the camera device. In particular, in this embodiment, as shown in FIG. 8, the following process steps occur: At step 870, multiple frames are received by the processor from the camera. A first frame 871 and a second, later, frame 872 are analyzed for motion. Then at 877, upon detecting motion, the processor determines a center coordinate of the area where motion was detected, then, enlarges from the center coordinate into a standard size, e.g., a 300×300, 530×530, or 800×800 square. At 878, the processor stores the 300×300 square (or another standard size) as a separate image. At 879 the processor transmits the saved centered picture to an AI engine, e.g., AMAZON or GOOGLE AI for human recognition.

In this embodiment, the human being inside the 300×300 picture area (zoomed in) is enlarged. This approach enhances the AI engine's ability to detect a human match. This process also excludes unnecessary monitoring areas for processing; focusing only on the areas of motion, thereby improving accuracy of detection, reducing false alarms, and reducing processing requirements.

Figure 9:
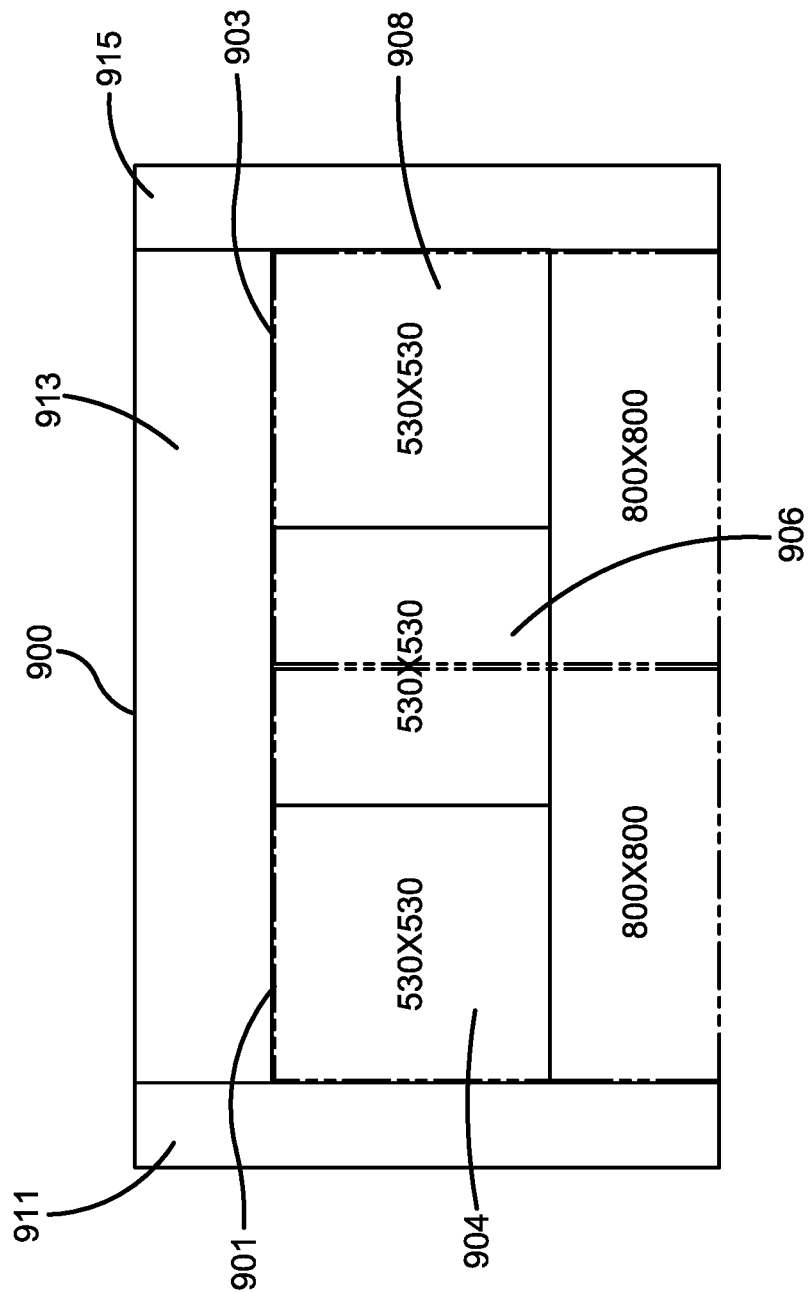
FIG. 9 is an illustration of a screen broken into portions for cyclical scanning according to an example method of processing.

In FIG. 9, a diagram corresponding to an alternate, zone-based detection algorithm is depicted. FIG. 9 discloses an example image frame 900 retrieved from a video image. This image frame 900 has a 1920×1080 high-definition resolution. The image is broken into several areas, which may be processed in a different manner/order. Starting from the top 913, a sky area is defined, and is ignored for processing, since a drowning risk would not occur in this area and would be highly unlikely to enter from this area. Along the left and right edges 911, 915, in this embodiment, a distortion edge (an effect caused by the camera lens reducing accuracy/clarity of the image) is also ignored. In this embodiment, a fish-eye lens is used on the camera to improve the width of monitoring area, but such lenses have particular distortion at the edges. The distortion edge may be, e.g., 10 to 200 pixels, such as 25 to 100 pixels, or 30 to 70 pixels on each edge.

In the embodiment corresponding to FIG. 9, rather than detecting motion first, then zooming or excluding areas from the saved image that is processed, there are five valid detection zones in the middle, lower portion of the image and these zones are cyclically scanned, reduced in resolution (size) and directly processed by artificial intelligence (AI) to detect a human presence. And can be further processed to detect false alarms. Front left 901 and front right areas 903 each occupy an 800×800 resolution area (note these areas 901, 903 are larger and encompass part of the back left, back center, and back right areas 904, 906, 908). The back left, back center, and back right areas 904, 906, 908 are each 530×530 and overlap a middle area of the larger front left and front right areas. In an embodiment, these areas may vary by up to plus or minus 20%, plus or minus 10%, or plus or minus 5%. The ratios of these areas may be the same for different image resolutions. For example, the front left 901 and front right areas 903 may be in 1.5:1 ratio to the back left, back center, and back right areas 904, 906, 908, or deviate plus or minus 20%, plus or minus 10%, or plus or minus 5% from that ratio.

In an embodiment, the areas will be scanned for motion and human detection via AI in a dual cyclical order. For example, front left 901, front right 903, back left 904, back right 908; and, then in cycle 2, front left 901, front right 903, back center 906, then repeat at the beginning of cycle 1. The order of left and right can be reversed, for example, more generally, in cycle 1 may comprise or consist of front left 901 or front right 903, front right 903 or front left 901, back left 904 or back right 908, back right 908 or back left 904; and then cycle 2, front left 901 or front right 903, front right 903 or front left 901, back center 906, wherein if front left 901 or back left 904 is scanned, then front right 903 or back right 908 is scanned in the same cycle. Depending on the capabilities of the computing device, e.g., processor speed/cores, RAM, cooling, more than one image portion could be scanned simultaneously. For example, two or three image portions could be scanned simultaneously. By breaking the image into smaller portions, this is zooming in a sense, on that smaller portion of the image. Focusing on the smaller, zoomed portion enables faster and/or more accurate processing for human detection and/or motion.

In an embodiment, when the cyclical scanning is performed all the multiple portions are scanned with artificial intelligence for human detection and the cycle is completed in 1.5 seconds or less, such as 1 second or less, or 0.5 seconds or less. The cycles run continuously, but numerous frames captured by the camera are skipped, since image processing and AI detection is not fast enough to be done in real time. In an embodiment, the AI processor works in conjunction with the camera to process an image, then immediately receive the next available image, process it, and immediately take the next available image, etc. This maximizes the image processing capabilities of the hardware without having to change the firmware. In other words, the processor instructions are not limited to a certain frame number sequence or number of frames per second, but is programmed to take the next camera frame available as soon as it is finished processing the preceding frame. In an embodiment, for example, 10% to 60%, or 20% to 50%, or 25% to 30% of frames from the camera may be processed and analyzed depending on the processor speed and frame per second (e.g., 10 fps to 60 fps, or 20 to 50 fps) of the video feed. In an embodiment, 1 to 10 frames per second, such as 2 to 7 fps, or 3 to 5 fps, can be processed, again depending on the processor.

Cycle 1 and cycle 2 alternate. This approach scans the edges of the water and vicinity around the water more than the back center 906 area. This enhances the speed of detection as the edges are the most likely area to first detect an intrusion event (compared to the middle of the water). Also, front left 901 and front right 903 will be scanned more frequently than the other areas. This is because, these are larger areas, and these areas capture both foreground and further away images. These areas are larger too. The area nearest the camera may be at or near a gate.

In an embodiment, for each portion of the image, the engine will shrink the image portion into 300×300 first, then use it for detection. For example, the front left 901 portion is 800×800 in pixels, it will be shrunk into 300×300, then used for detection, i.e., sent for processing. This shrinking can be performed by one or more of the following methods: Nearest-neighbor interpolation, Bilinear and bicubic algorithms, Sinc and Lanczos resampling, Box sampling, Mipmap, Fourier-transform methods, Edge-directed interpolation, hqx, Vectorization, or Deep convolutional neural networks. In another embodiment, the native resolution of the image portion will be used for detection without shrinking. In either embodiment, during each cycle, if there is a human detected, an alarm will be sent. Then the same cycle will restart.

In an embodiment, the AI software resides on a computing device in the camera device, which enables the fastest and most direct processing at the vicinity of the pool without having to go through the Internet for cloud-based resources. The computing device in the camera device also controls the basic functioning of the device to process the images and provide a local alarm from the camera and the extender (via ZigBee network) even if the Wi-Fi connection is lost.

The onboard AI can include algorithms based on learned image recognition for humans, and may be particularly tuned to children or humans of small stature. Neural network and deep learning technology can be utilized in this system. In an example, the AI system could be trained by loading into it thousands of labeled images various items and humans that might be in a pool area, e.g., children and adults of various shapes, colors, and sizes, birds, deck chairs, umbrellas, floating toys, etc. By finding visual patterns in the images that correlate with particular labels, the AI system can reliably recognize humans in the real-time images fed to it.

The camera is capable of a certain frame speed, e.g., 15 fps (frames per second), such as 5 to 60 fps, or 10 to 30 fps. In an embodiment, depending on processor speed and temperature (e.g., 77 F), processing of each image portion may take from 50 milliseconds/frame to 1.5 sec/frame, such as for example, 100 milliseconds to 500 milliseconds per frame, or 200 milliseconds to 400 milliseconds per frame. Thus, each cycle can take three to four times the individual image processing speed. In an embodiment, if a human suspect is detected in an image portion, e.g., front left 901, the cycle resets, so as to more quickly scan and detect for humans in the same frame again for an anti-false alarm method. In an embodiment, if a human suspect is detected in an image portion, e.g., back center 906, because each image is cached, the same frame (here back center 906) could be immediately scanned again by pulling the image portion from the cached next frame, and skipping the image portion out of turn. This allows an even quicker focus on the image portion for anti-false alarm methods to run on it. However, once the anti-false alarm methods are run, the cyclical scanning returns to normal.

In an embodiment, computing resource conserving functionality and/or false alarm prevention algorithms are also integrated into the system. In general in this embodiment, video monitoring is performed on an area including around a body of water, and above or at a top surface of the water. The presence of a human suspect in the monitored area is detected through processing images of the video with artificial intelligence (as discussed elsewhere herein). An image is stored, e.g., temporarily cached upon detection of the human suspect in the monitored area. Then the stored image is processed by one or more of the methods discussed below to determine if the detection was a false alarm. If the human suspect is determined to be a human in the monitored area, then the notification processes discussed elsewhere herein will be engaged, such as by causing an alert to be transmitted locally (in the monitored area) or to a mobile device. By "causing an alert to be transmitted" or "transmitting an alert" it is meant that a communication is transmitted that signals the end device that includes a speaker to sound an alert/alarm, or put an alert/alarm on the screen.

In an embodiment, every frame is not sent to the AI engine for human detection. Instead, some frames will be skipped to save computing resources. For example, with 3 consecutive frames, only the first and the third frames will be processed. The second one will be skipped and not processed.

In an embodiment, up to three levels of false alarm prevention may be used. If a false alarm is detected, then the system can either provide the alert, but with a notice that it may be a false alarm or it may not provide the alert at all. Level 1 focuses on the detection of a moving object, not something standing there like a human being (for example, sometimes an umbrella will be considered a human being by an AI machine). To determine a detection is valid, in a false alarm prevention process, the AI engine must validate it is seeing a human being. This can be done as follows.

Figure 10:
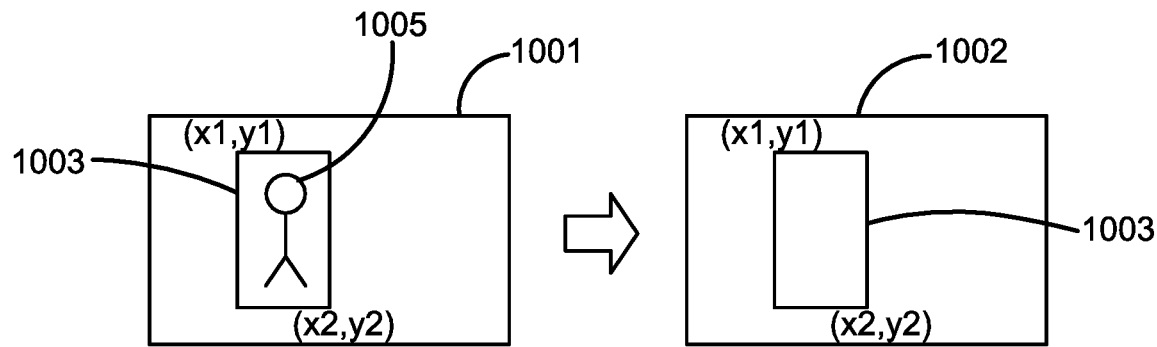
FIGS. 10-12 are schematic views illustrating example methods for anti-false alarm detection.

A first false alarm detection method is shown in FIG. 10. A first image frame 1001 includes an area defined by a rectangle boundary having the indicator coordinates of (x1, y1) and (x2, y2). When a detection occurs, the AI engine will output the detected object coordinates with top-left (x1,y1) and bottom-right (x2,y2) coordinates. This will determine the rectangle size |x2-x1| and |y2-y1|, as well as location. These coordinates define the top-left and bottom-right corners of a rectangular area 1003 around an object 1005 in the first image. This area 1003, or more technically, the pixels in this area, are saved as picture 1. The system then waits for the next frame 1002, that is a subsequent frame without a human suspect detected inside it. At this point, the same area 1003 of the next empty frame 1002 is saved as picture 2. In an embodiment, the next image portion may be skipped so as to allow greater time to pass to detect motion.

Then, a comparison between picture 1 and picture 2 is performed at a quantitative pixel level. The difference in pixels from picture 1 and picture 2 must be greater than a predetermined difference. This may be, e.g., 30% of different pixels, 10%, or 5%. This threshold should be set to account at least for changes in lighting from cloud movement in the outdoor environment. If the threshold is not met, then the system can determine the object is stationary and likely not a human. In an embodiment, a quantitative light sensor can be incorporated in dynamically setting the threshold. For example, if the total light sensed does not change more than 1% between the first and second frames 1001, 1002, then the threshold remains low, but if there is a significant change in total light sensed (e.g. 10%), the threshold may be raised to account for this, e.g., by the same amount. In an embodiment, if the threshold is not met this will prevent an alarm from being triggered.

Level 2 false alarm detection focuses on eliminating objects that are in actuality too small to be a human being. This involves scanning multiple areas of a captured image in which motion was detected for objects meeting a threshold pixel height, the threshold pixel height being different in each area. From a live-view perspective, an object will be bigger at the near end (i.e., close by the camera), and smaller when it is near the far end. This process considers that even a 1 or 2-year-old child will have a minimum pixel height in each scanned area (e.g., the areas of FIG. 11).

Figure 11:
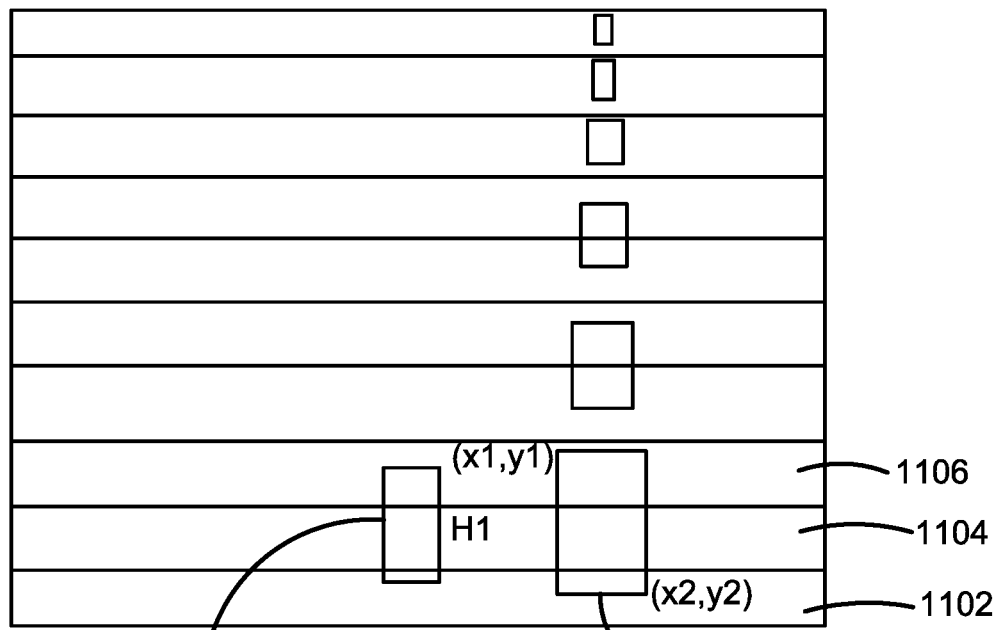

For each valid detection subject to the level 2 false alarm method, the system will check that a threshold pixel height of the detected object is met. FIG. 11, for example, shows a pre-defined series of object heights criteria in schematic form. It shows an object 1101 with a height H1, that crosses a first, second, and third vertical scanning level 1102, 1104, 1106. Various different minimum height objects are depicted on the right of FIG. 11. The object 1101, is less than the minimum height 1105 for objects that start at the first scanning level 1102. Thus, a false alarm is detected.

The threshold heights are based on image coordinates for several different vertical scanning areas. Generally, the minimum height will be greater nearer the bottom of the image. For example, for an object detected near the top of the image, the minimum height of H1 will be smaller than a minimum height near the bottom of the image. If a minimum height is not met this will be considered an invalid detection and no alarm will be triggered. The minimum height may be defined in terms of pixels, e.g., 100, 50, or 40 pixels. In an embodiment, the minimum height H1 for each scanning zone can be a multiple of a single threshold value, with the multiple based on what vertical level scanning area the object is found in, with the highest minimum height being at the (lowest) first scanning level 1102.

Figure 12:
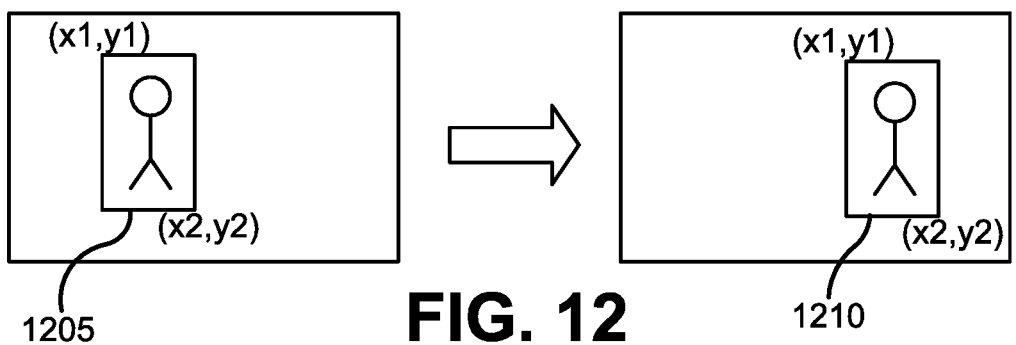

Finally, the level 3 false alarm prevention focuses on positive detection of a human being who is actually moving. This may be considered an enhancement or complement to level 1. FIG. 12 is a schematic illustrating this method. After the system is armed, a notification is sent upon a first detection event, i.e., a human suspect is determined to be present. The system stores the coordinates associated with the detection event as a rectangular area 1205 based on the total screen area (top left x1, y1 and bottom right x2, y2). The coordinates top-left(x1,y1) and bottom-right(x2,y2) around the object detected as moving are stored, a rectangle will be determined by these two sets of coordinates.

When a subsequent detection event occurs, new coordinates associated with the detection event area will be retrieved again (see second rectangular area 1210) top-left (x11,y11) and bottom-right (x21,y21). Using the coordinates of FIG. 12 as an example, for the event to pass the false alarm prevention test, the difference (offset) of either one of |x11-x1|, |y11-y1|, |x21-x2|, |y21-y2| must be greater than a previously defined threshold for either x or y dimensions. For example, the threshold may be predefined as 3, 5, or 10 pixels. The interval between two frames varies based on processor computing power. For example, it may be 0.1 to 3 seconds, such as 0.5 to 2 seconds, or 0.8 to 1.5 seconds. Thus, any movement of an object greater than this value will pass the false alarm test and an alarm notification will be allowed to be triggered.

Figure 13:
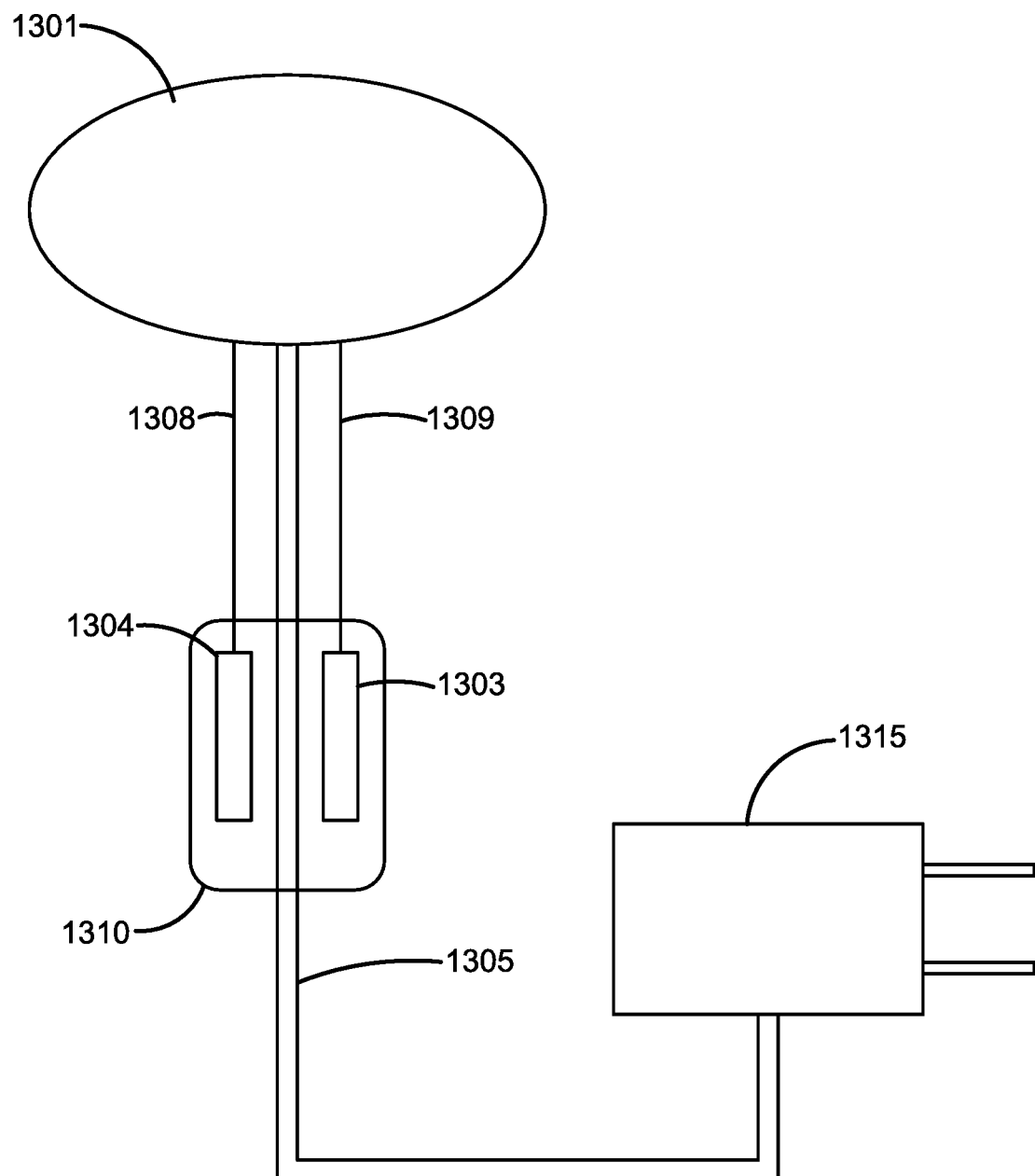
FIG. 13 is an example camera device housing with an exterior antenna housing.

FIG. 13 is schematic of an embodiment comprising the camera device 1301 and its associated dual wireless Wi-Fi and Zigbee antennae 1303, 1304. In testing it was found that having wireless antennae 1303, 1304 in the housing of the camera device 1301 provided a poor range for wireless transmission and reception. Thus, these antennae 1303, 1304 were moved into an antenna housing 1310 located outside the camera device 1301, and in this embodiment, along the power cord 1305. This also allows different material choices for the camera device 1301, in an embodiment, the housing of the camera device 1301 is metal and the antenna housing 1310 is polymeric, e.g. plastic. However, in an embodiment, one or more of the antennae 1303, 1304, could be housed inside the camera device 1301.

As mentioned above, in an embodiment, the camera device 1301 includes a computing device which is in electrical communication with a Wi-Fi antenna 1303 and a ZigBee network antenna 1304. A ZigBee antenna 1304 supports ZigBee networking as outlined in the Institute of Electrical and Electronics Engineers (IEEE) wireless networking standard IEEE 802.15.4. A Wi-Fi antenna 1303 supports Wi-Fi networking and corresponds to the IEEE 802.11 standards for communications. In this embodiment, the power cord 1305, including a positive wire and ground wire, and running electricity at, e.g. 12 V, is coupled to the camera device 1301 and is included in the same cord 1305 with wires to the dual antennae 1303. While the wires 1308, 1309 connecting the antennae 1303 to the camera device 1301 end at the antenna housing 1310, the power cord 1305 continues through the antenna housing 1310 and to a standard DC adapter 1315 including or coupled to a standard wall plug. The power is converted to DC prior to entering the antenna housing 1310. In other embodiments, the antenna wires 1306, 1307 and housing 1310 can be separate from the power cord 1305.

Figure 14:
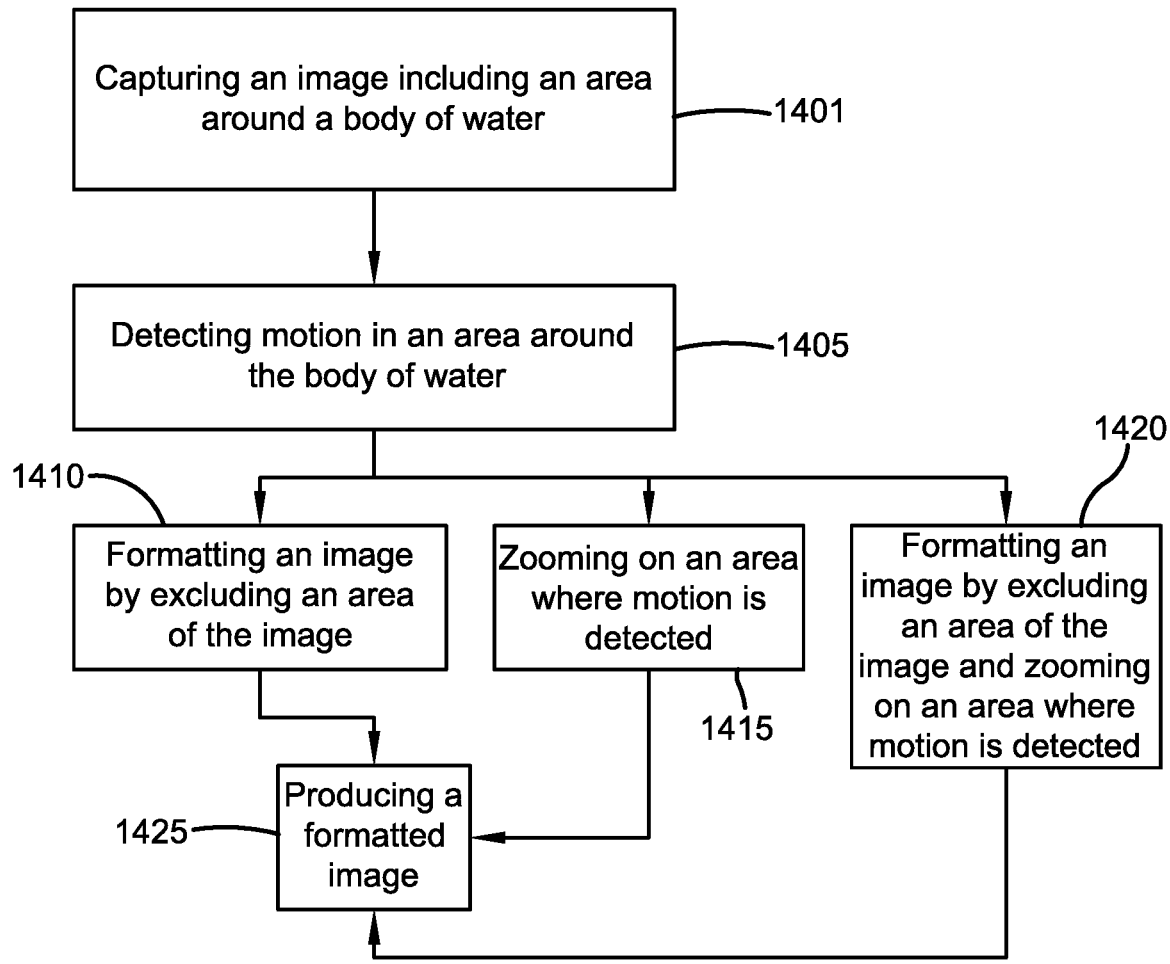
FIG. 14 is a flow chart illustrating an example method of motion detection and image processing.
Figure 15:
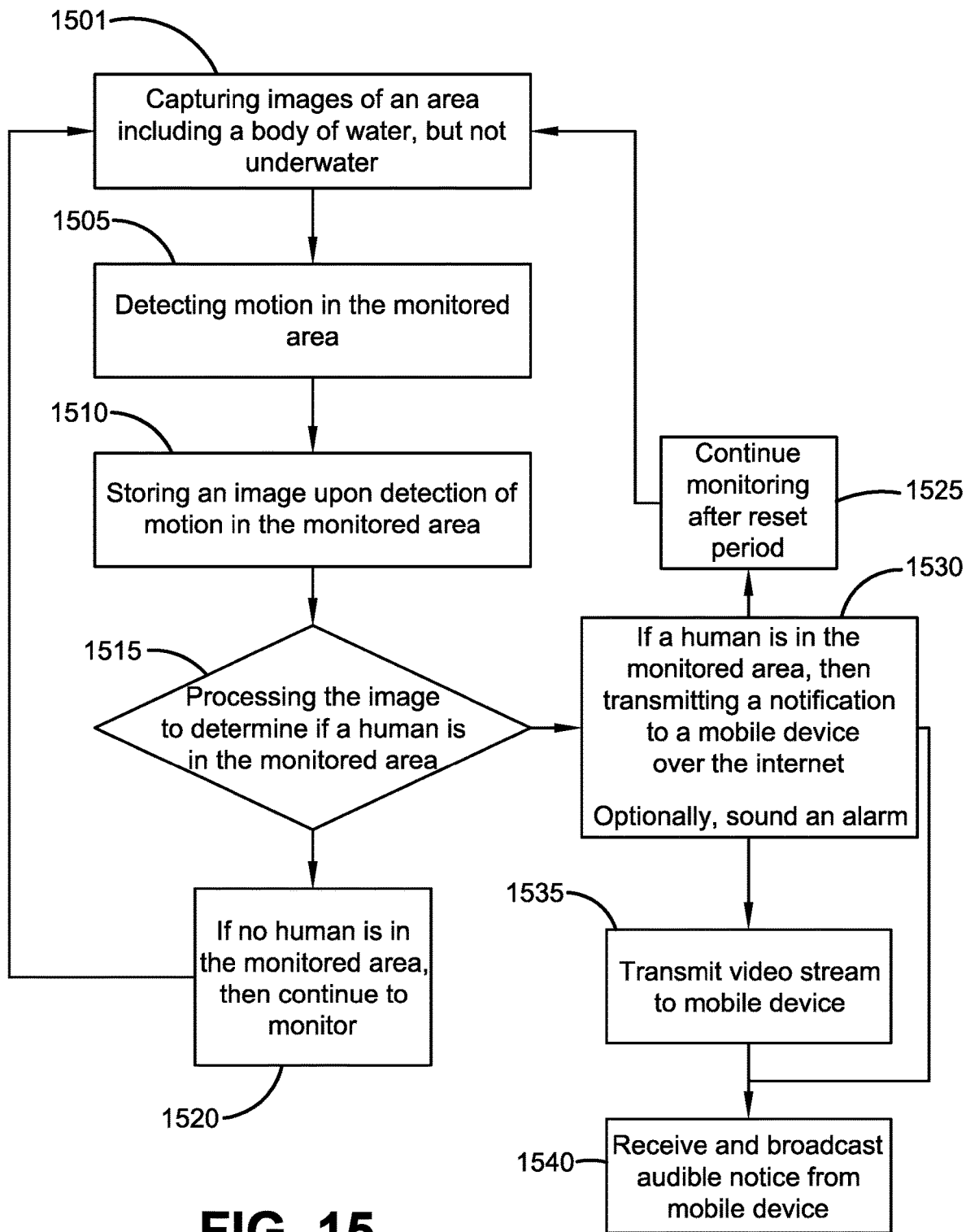
FIG. 15 is another flow chart illustrating an example method of motion detection and image processing.

FIGS. 14 and 15 show graphical representations of computer implemented methods for promoting water safety. In an exemplary method, executable by the system disclosed herein, at 1401 the method begins by capturing an image including an area around a body of water. This can be done, for example, by a camera device disclosed herein. At 1405, motion is detected in the area around the body of water. Motion detection can, for example, be performed by a computing device with methods disclosed herein. Then at least one of three steps takes place. At 1410, an image is formatted by excluding an area of the image, for example, the predefined around the top and side edges of the image are excluded, as described above. This reduces the amount of image area that is processed. At 1415, an area where motion is detected is zoomed on. By zoomed on, it is meant that the zoomed area is defined and stored, to the exclusion of other parts outside the zoomed area. At 1420, formatting is performed on the image by excluding an area of the image and zooming on an area where motion is detected. This is a combination of 1410 and 1415. The result of these processes is at 1425, a formatted image, that is saved for further processing, e.g., an AI driven process to identify pool safety risks.

FIG. 15 is a flow chart showing an exemplary method of promoting water safety. At 1501 images are captured of an area including around a body of water, but not underwater. At 1505 motion is detected in the monitored area. At 1510, an image is stored, upon detection of motion in the monitored area. The detection of motion triggers the image to stored, e.g. temporarily cached for processing. At 1515, the image is processed to determine if a human is in the monitored area. This can be accomplished by the methods disclosed herein. If a human is not in the monitored area, then at 1520, the method restarts and monitoring continues at 1501. If a human is in the monitored area, then at 1530, there is transmission of a notification to a mobile device over the Internet. In addition, an audible alarm may be sounded in the vicinity of the body of water and/or in house nearby the body of water. In addition, an audible alarm may be triggered to broadcast from the mobile device, alerting them to the presence of human in the pool area. Here two operations may occur, at 1525, there is a reset period and monitoring continues of the monitored area at 1501 for additional events. Also, perhaps contemporaneously, at 1535, a video stream of the monitored area can be streamed to a mobile device running the system control application. This can be streamed upon request or pushed immediately to the mobile device. At 1540, also potentially contemporaneously with, and in addition to or instead of step 1535, an audible alarm is received from the mobile device and broadcast, e.g., in the pool area. This may be a warning from the homeowner addressed to anyone in the pool area.

Figure 16:
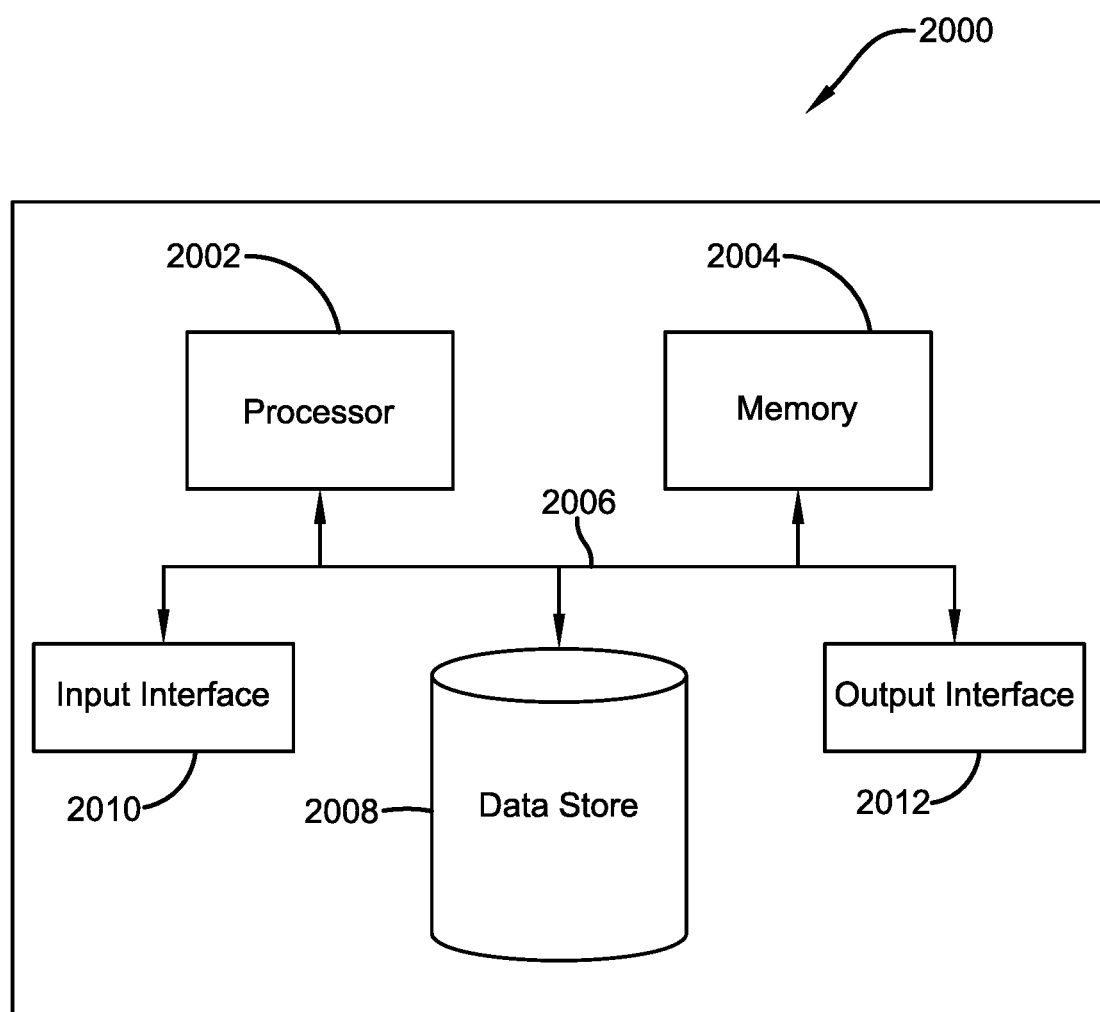
FIG. 16 is a schematic of an example computing device for use in the methods and devices described herein.

Referring now to FIG. 16, an illustration of an exemplary computing device 2000 that can be used in accordance with the pool safety devices and systems disclosed herein is illustrated. In an example, FIG. 11 is an example of a computing device interfacing with system described herein.

The computing device 2000 includes data storage 2008 that is accessible by a processor 2002 by way of the system bus 2006. The data storage 2008 may include executable instructions to operate the processor 2002 and other components. The computing device 2000 also includes an input interface 2010 that allows external devices to communicate with the computing device 2000. For instance, the input interface 2010 may be used to receive input from a peripheral device, such as a camera, or instructions from an external computer device, such as from a user. The computing device 2000 also includes an output interface 2012 that interfaces the computing device 2000 with one or more external devices. For example, the computing device 2000 may display text, images, etc. by way of the output interface 2012.

It is contemplated that the external devices that communicate with the computing device 2000 via the input interface 2010 and the output interface 2012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 2000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 2000 may be a distributed system. Thus, for instance, several computing devices may be in communication by way of a network connection and may collectively perform tasks described as being performed by the computing device 2000. For example, a computing device may be at various devices of the system, e.g., the keypad, the camera, the speaker, and the user's mobile device.

Figure 17:
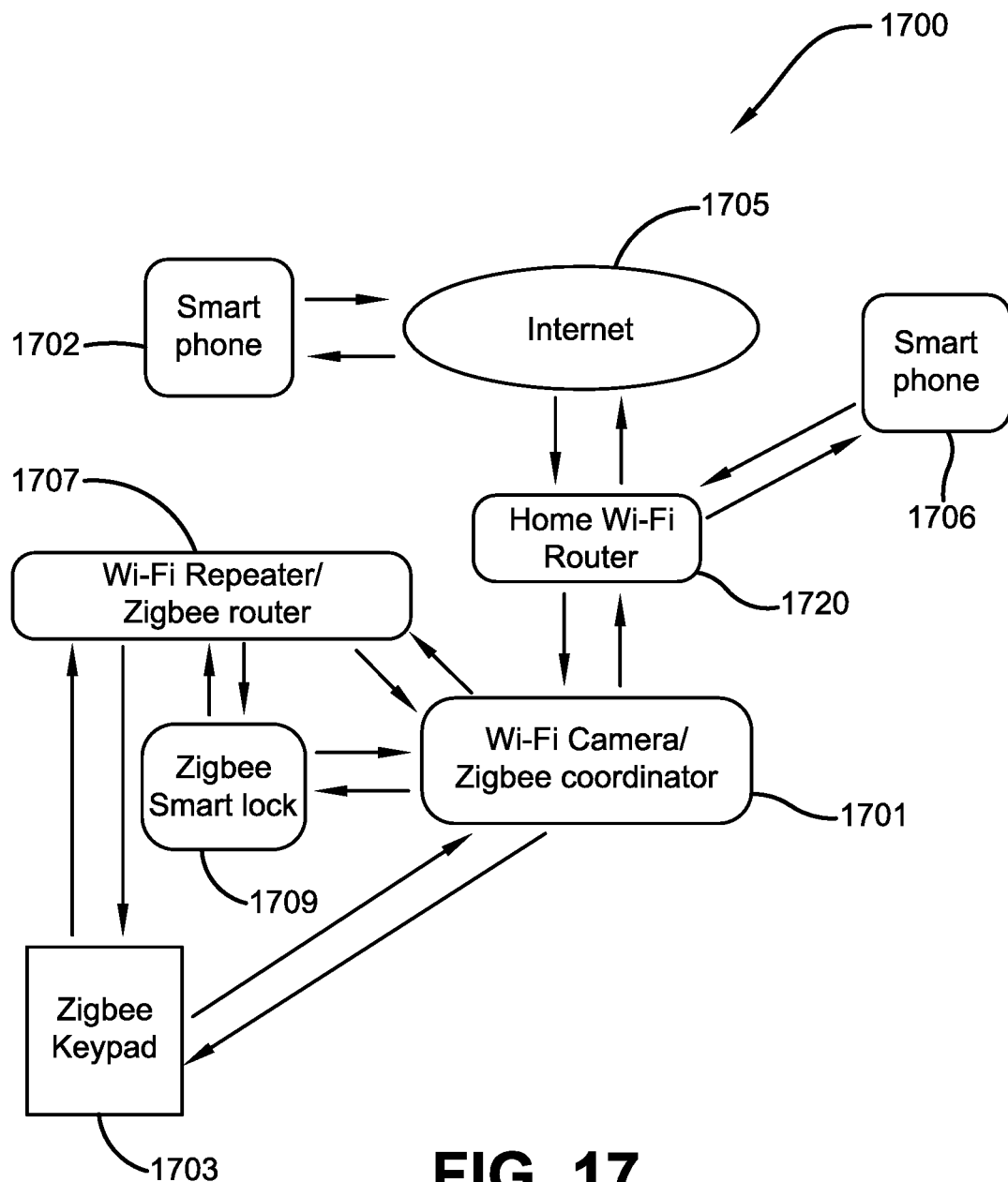
FIG. 17 shows a schematic of the camera unit with a cord and antenna.

FIG. 17 shows a diagram of an embodiment of a system 1700 similar to that shown in FIG. 4, but with additional features of a smart lock 1709 networked to the system 1700 and a second mobile device 1706 linked directly to the system through the home WiFi router 1720. The smart lock 1709 is linked to the system 1700, e.g., through a Zigbee connection. In particular, it is in communication with the extender 1707 and the camera device 1701. The camera device 1701 acts as the Zigbee coordinator, and the extender 1707 acts as a Zigbee router. In addition, a second mobile device 1706 is shown in this embodiment, which is connected directly to the home WiFi router 1720. This second mobile device 1706 can be notified and communicate with the system, without having to go through the Internet or a cellular network. The remaining components of the system 1700 of FIG. 17 are the same as described with respect to FIG. 4.

In operation, the smart lock 1709 can be paired with the other components of the system 1700 in the same manner discussed above for the keypad component. In an embodiment, the keypad 1703 transmits a communication to the camera device 1701, for example, an entry code. The camera device 1701 then transmits a communication to the smart lock 1709 authorizing entry into the pool area, triggering the smart lock 1709 to open. Alternatively, if the smart lock 1709 is out of range or in a poor coverage area of the Zigbee range of the camera device 1701, the extender 1707 can be used to route the Zigbee signal to the smart lock 1709 to and from the camera device 1701.

In another mode of operation, the smart lock 1709 can be operated remotely by the mobile device 1702, 1707 running the system control application. Through communicating through the Internet 1705, or directly with the Wi-Fi router 1720, the mobile devices 1702, 1706 send a communication to the camera device 1701, which then transmits a command to the smart lock 1709, directly or through the extender 1707.

The system 1700 can also monitor the status of the smart lock 1709 as being open or closed and notify the user through the mobile devices 1702, 1706, if the gate is left open. In an embodiment, triggering the smart lock 1709 to open will cause a notification to the mobile devices 1702, 1706, alerting the user, and optionally providing a video feed of the pool area to the mobile devices 1702, 1706.

The smart lock 1709 can be placed on a fence gate, or a door to a house nearby the pool, or some other entryway into the pool area. The smart lock 1709 governs access to the entryway by, for example, a magnetic mechanism, wherein an electrical impulse turns an electromagnet on or off to allow the lock to lock or unlock. It could also be a mechanical locking system utilizing an electric motor to mechanically move a bolt to open or close the lock. Multiple smart locks 1709 can also be networked with the system 1700 and operated by the system control application.

While a Zigbee network is mentioned herein as an alternative and/or additional network to Wi-Fi, other wireless network protocols, e.g., Bluetooth, could also be used for either Wi-Fi or Zigbee. In any case, there is value in there being two different networks in the system for redundancy.

In yet another embodiment, a system control application has functionality to allow a temporary disarm/entry code to be generated and transmitted over the internet to the keypad 103 via the camera device 101 and/or extender 107, by WiFi or Zigbee connection. In this embodiment, for example, the user can initiate a temporary code, which can be randomized or set by the user, to be enabled on the keypad from their mobile device. The temporary code adds an entry code, rather than replacing the user's permanent code already stored in the system. This functionality can be used to grant access to a visitor temporarily without providing them with the owner's permanent code. The code can be set up to expire within a predetermined time, such as 30 minutes to 1 month, 90 minutes to 7 days, 2 hours to 1 day, or 1 hour to 3 hours. At the time of expiration, the code will be inactivated. In another embodiment, the code can be active indefinitely until the user deactivates it from the system control application. The temporary code can also be used to both disarm the monitoring by the camera device 101 (which is unneeded when the pool knowingly occupied and prevents the generation of numerous alerts), and to grant entry via the smart lock 1709.

In a particular usage situation, the temporary code for disarming/entry enhances a pool rental capability. In an example, a separate Internet-based application for renting pools can interface with the system control application described herein. In an example, once a rental is confirmed, a notice is sent to the system control application identifying the system at the rented pool and the time period for the rental, the system control application then generates a temporary, randomized code with the time period of the rental, which designates the time that the code will be active. The system control application then finds the network address of the system associated with the rented pool and transmits the temporary code and the timing information to the system. The system activates the code when the start time arrives and deactivates the code when the end time is reached. Alternatively, the system control application can send the code to the designated system when the start time arrives and can deactivate the code when the end time is reached. In another alternative, some of these steps can be performed manually. For example, the owner can be sent the pool rental notification and can generate the temporary on their mobile device in accordance with the start and end time.

Further functionality associated with this feature, is that the camera device can be enabled for storing images of the pool environment contemporaneously with the rental period, such as only at the beginning and after a rental period. These images would then be saved for later retrieval if needed, or uploaded to the separate rental website backend system, and/or the system control application, or emailed to both parties through the system control application. This provides the owner with a record of the state of the pool area before and after the renters are in the area, thereby providing evidence of the cause of any damage. This limited imaging preserves rights of the owner to gather evidence of damage, and preserves privacy of the renters without resorting to full-time surveillance. In an embodiment, the temporary code could also automatically disable the video streaming function on the system control application to give further confidence to the renters of privacy.

Further functionality associated with this feature is that camera device 101 through its speaker (and/or a separate networked speaker) can be triggered by the system control application to prompt a warning to renters a few minutes before their rental period expires: for example, 30 to 1 minute, 15 to 2 minutes, or 12 to 5 minutes before the rental period expires. For example, the following pre-recorded message may be played: "your rental time slot is about to expire in 5 minutes, please prepare to vacate the premise unless you wish to extend your rental . . . " Extension of the rental or an attempt to do so, can be performed on the separate rental Internet application under the renter's account. If successful, the temporary access can then be extended by a communication being sent from the system control application in the manner explained above, only a new code need not be provided, only an extension of the end time period for disarming and entry may be updated.

As used herein, the term "system" is intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and BLU-RAY (BD), where disks usually reproduce data magnetically and discs usually reproduce data optically with lasers. Further, in an example, a propagated signal is not included within the scope of computer-readable storage media or display data. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Furthermore, to the extent that the term "includes" is used in either the detailed description or the claims, such term is intended to be inclusive in a manner similar to the term "comprising" as "comprising" is interpreted when employed as a transitional word in a claim. The term "consisting essentially" as used herein means the specified materials or steps and those that do not materially affect the basic and novel characteristics of the material or method. If not specified above, any properties or measurements mentioned herein may be determined by applicable ASTM standards, or if an ASTM standard does not exist for the property, the most commonly used standard known by those of skill in the art may be used. The articles "a", "an", and "the" should be interpreted to mean "one or more" unless the context indicates the contrary.

It is claimed:

1. A method for promoting water safety comprising the steps of:

video monitoring an area including around a body of water, and above or at a top surface of the water;
detecting a presence of a human suspect in the monitored area through processing images of the video with computer implemented artificial intelligence;
storing an image upon detection of the human suspect in the monitored area;
processing the stored image to determine if the detection was a false alarm; and
if the human suspect is determined to be a human in the monitored area, then transmitting an alert, either to a device in the area being monitored, to a device inside a home, to a mobile device, or any combination of these;
wherein the processing of the stored image to determine if the detection was the false alarm includes processing the stored image including the human suspect to determine the false alarm by one or more of the following false alarm detection steps:
  comparing the stored image including the human suspect and a second subsequent image of a same view to determine if a threshold level of pixels have changed;
  scanning multiple areas of the stored image including the human suspect for a human suspect meeting a threshold pixel height, the threshold pixel height being different in each area; or
  comparing the stored image including the human suspect and a second subsequent image of the same view, and determining if a threshold number of pixels in an area around coordinates corresponding to a detection event have changed,
if a false alarm is not detected, then transmitting an alert, either to a device in the area around the body of water, to a mobile device, or both.

2. The method of claim 1, wherein the step of comparing first and second images to determine if a threshold level of pixels have changed is performed.

3. The method of claim 2, wherein the step of scanning multiple areas of the image in which motion was detected for a human suspect meeting a threshold pixel height, the threshold pixel height being different in each area is performed.

4. The method of claim 3, wherein the step of comparing the stored image including the human suspect and a second subsequent image of the same view, and determining if a threshold number of pixels in an area around coordinates corresponding to a detection event have changed is performed.

5. The method of claim 4, further comprising formatting the images to eliminate an upper portion and side portion of the image and storing a formatted image for use in the step of processing the images to determine the presence of a human suspect by utilizing artificial intelligence.

6. The method of claim 1, wherein the step of scanning multiple areas of the image in which motion was detected for a human suspect meeting a threshold pixel height, the threshold pixel height being different in each area is performed.

7. The method of claim 1, wherein the step of comparing the stored image including the human suspect and a second subsequent image of the same view, and determining if a threshold number of pixels in an area around coordinates corresponding to a detection event have changed is performed.

8. The method of claim 1, further comprising formatting the images to eliminate an upper portion and side portion of the image and storing a formatted image for use in the step of processing the images to determine the presence of a human suspect by utilizing artificial intelligence.

9. The method of claim 1, further comprising transmitting a video feed of the monitored area to the mobile device.

10. The method of claim 1, further comprising, receiving audio input from the mobile device and transmitting it to a speaker in audible range of the monitored area.

11. The method of claim 1, further comprising receiving input to enable or disable the monitoring through a keypad in a vicinity of the body of water, through a mobile device, or both.

12. A method for promoting water safety comprising the steps of:
- video monitoring an area including around a body of water, and above or at a top surface of the water;
- detecting a presence of a human suspect in the monitored area through processing images of the video with computer implemented artificial intelligence;
- storing an image upon detection of the human suspect in the monitored area;
- processing the stored image to determine if the detection was a false alarm; and,
- if the false alarm is not determined to be present or if the processing the stored image to determine if the detection was a false alarm is not performed, then transmitting an alert, either to a device in the area being monitored, to a mobile device, or both;
- wherein a camera device performing the video monitoring is in communication with a WiFi network through an extender; and the extender is in communication with the camera device through the WiFi network and a Zigbee network;
- wherein the processing of the stored image to determine if the detection was the false alarm includes processing the stored image including the human suspect to determine the false alarm by one or more of the following false alarm detection steps:
  - comparing the stored image including the human suspect and a second subsequent image of a same view to determine if a threshold level of pixels have changed;
  - scanning multiple areas of the stored image including the human suspect for a human suspect meeting a threshold pixel height, the threshold pixel height being different in each area; or
  - comparing the stored image including the human suspect and a second subsequent image of the same view, and determining if a threshold number of pixels in an area around coordinates corresponding to a detection event have changed;
- if a false alarm is not detected, then transmitting an alert, either to a device in the area around the body of water, to a mobile device, or both.

13. The method of claim 12, wherein the alert is transmitted from the camera device via the extender to the WiFi network, then to the mobile device via the Internet; and further transmitting a redundant notification from the camera device to the extender through the Zigbee network, and then to the mobile device via the Internet.

14. The method of claim 12, wherein the extender is coupled to a device capable of emitting an audible alarm, and sounding an alarm when the alert is received at the extender.

15. The method of claim 12, further comprising automatically connecting the extender to the WiFi network using a WiFi network ID and password transmitted from the camera device over the Zigbee network.

16. A method for promoting water safety comprising the steps of:
- capturing multiple images including an area around a body of water and the body of water;
- monitoring for a human presence in the area around the body of water and the body of water by cyclically scanning multiple portions of the images for a human suspect, the multiple portions including: front left, front right, back left, back right, and back center;
- wherein the multiple portions are scanned in the following scanning order:
  - cycle 1, front left or front right, front right or front left, back left or back right, back right or back left; and then
  - cycle 2, front left or front right, front right or front left, back center;
- wherein if front left or back left is scanned, then front right or back right is scanned in the same cycle;
- the scanning order is then repeated at least until a human suspect is detected.

17. The method of claim 16, further comprising transmitting an alert, either to a device in the area around the body of water, to a mobile device, or both.

18. The method of claim 16, wherein the multiple images are processed to determine the presence of a human suspect by utilizing artificial intelligence instructions loaded onboard a camera device performing the monitoring step.

19. The method of claim 16, further comprising storing the image with the human suspect, performing one or more false alarm detection processes on the image, and transmitting an alert, either to a device in the area around the body of water, to a mobile device, or both if no false alarms are determined to be present.

20. The method of claim 16, further comprising formatting the multiple images to eliminate an upper portion and side portion of the multiple images and storing a resulting formatted image for use in the step of cyclically scanning for multiple portions of the images.

* * * * *